United States Patent
Jayabal et al.

(10) Patent No.: US 10,664,135 B2
(45) Date of Patent: May 26, 2020

(54) CORRELATING MULTIPLE DRILLING DATA STREAMS TO GENERATE GRAPHICAL WIDGETS FOR DISPLAY ON A GRAPHICAL USER INTERFACE

(71) Applicant: NABORS DRILLING TECHNOLOGIES USA, INC., Houston, TX (US)

(72) Inventors: Jayaprasad Jayabal, Houston, TX (US); Srikanth Valleru, Spring, TX (US); Namitha Vinay, Cypress, TX (US)

(73) Assignee: NABORS DRILLING TECHNOLOGIES USA, INC., Houston, TX (US)

( * ) Notice: Subject to any disclaimer, the term of this patent is extended or adjusted under 35 U.S.C. 154(b) by 107 days.

(21) Appl. No.: 16/161,899

(22) Filed: Oct. 16, 2018

(65) Prior Publication Data

US 2020/0117318 A1    Apr. 16, 2020

(51) Int. Cl.
*G06F 3/0482* (2013.01)
*G06F 17/15* (2006.01)
*E21B 47/12* (2012.01)

(52) U.S. Cl.
CPC ............ *G06F 3/0482* (2013.01); *E21B 47/12* (2013.01); *G06F 17/15* (2013.01)

(58) Field of Classification Search
None
See application file for complete search history.

(56) References Cited

U.S. PATENT DOCUMENTS

| | | | | |
|---|---|---|---|---|
| 2009/0132942 A1* | 5/2009 | Santoro | ................. | G06F 3/0481 715/765 |
| 2012/0272174 A1* | 10/2012 | Vogel | ..................... | E21B 41/00 715/772 |
| 2014/0246238 A1* | 9/2014 | Abbassian | .............. | E21B 47/10 175/40 |

* cited by examiner

*Primary Examiner* — Tuan S Nguyen
(74) *Attorney, Agent, or Firm* — Haynes and Boone, LLC

(57) ABSTRACT

Apparatus, systems, and methods for correlating multiple data streams to generate a graphical widget for display on a graphical user interface. The method generally includes drilling a well segment using a drilling rig. During the drilling of the well segment, detecting, using first and second sensors, first and second drilling conditions, respectively. first and second data streams based on the detected first and second drilling conditions, respectively, are received at a first surface location. A first user input is received at the first surface location. The first and second data streams are correlated based on the first user input. A first graphical widget is generated based on the correlated first and second data streams. Finally, the first graphical widget is displayed on a graphical user interface (GUI).

20 Claims, 11 Drawing Sheets

CORRELATING MULTIPLE DRILLING DATA STREAMS TO GENERATE GRAPHICAL WIDGETS FOR DISPLAY ON A GRAPHICAL USER INTERFACE

TECHNICAL FIELD

The present disclosure relates generally to data collection during oil and gas drilling operations and, more particularly, to correlating multiple data streams to generate a graphical widget for display on a graphical user interface.

BACKGROUND

During oil and gas wellbore operations (e.g., drilling operations) data is typically received by a control system from multiple sources and displayed on a graphical user interface to aid rig operators in visualizing wellbore conditions. More particularly, existing electronic drilling recorder ("EDR") systems typically include scroll graphs, annunciators, and gauges to display real time gauge readings of different data channels. However, existing EDR systems are lacking in user configurability that could make the display of such data more impactful to a particular user or group of users. Therefore, what is needed is an apparatus, system, and/or method that addresses the foregoing issue(s), and/or one or more other issue(s).

BRIEF DESCRIPTION OF THE DRAWINGS

FIG. 6A-1 is a graphical view of a first portion of a display pane of a user interface displayed during at least a portion of the well system operation shown in FIG. 5, according to one or more embodiments of the present disclosure.

FIG. 6A-2 is a graphical view of a second portion of the display pane of the user interface displayed during the at least a portion of the well system operation shown in FIG. 5, according to one or more embodiments of the present disclosure.

DETAILED DESCRIPTION

Figure 1:
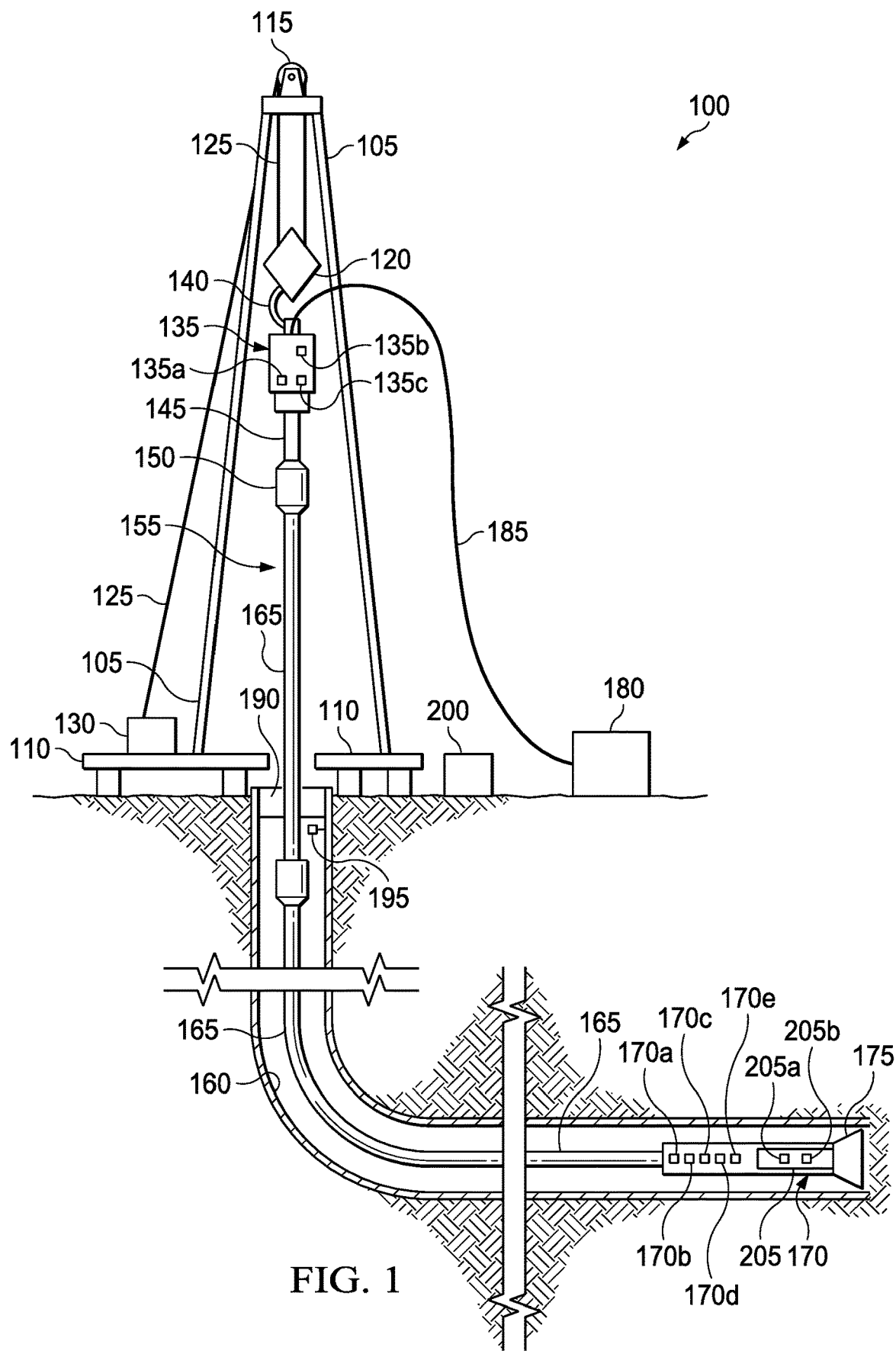
FIG. 1 is a schematic elevational view of a well system, according to one or more embodiments of the present disclosure.

In an embodiment, as illustrated in FIG. 1, a well system (e.g., a drilling rig) for implementing one or more embodiments of the present disclosure is schematically illustrated and generally referred to by the reference numeral 100. The well system 100 is or includes a land-based drilling rig—however, one or more aspects of the present disclosure are applicable or readily adaptable to any type of drilling rig (e.g., a jack-up rig, a semisubmersible, a drill ship, a coiled tubing rig, a well service rig adapted for drilling and/or re-entry operations, and a casing drilling rig, among others). The well system 100 includes a mast 105 that supports lifting gear above a rig floor 110, which lifting gear includes a crown block 115 and a traveling block 120. The crown block 115 is coupled to the mast 105 at or near the top of the mast 105. The traveling block 120 hangs from the crown block 115 by a drilling line 125. The drilling line 125 extends at one end from the lifting gear to drawworks 130, which drawworks 130 are configured to reel out and reel in the drilling line 125 to cause the traveling block 120 to be lowered and raised relative to the rig floor 110. The other end of the drilling line 125 (known as a dead line anchor) is anchored to a fixed position, possibly near the drawworks 130 (or elsewhere on the rig).

The well system 100 further includes a top drive 135, a hook 140, a quill 145, a saver sub 150, and a drill string 155. The top drive 135 is suspended from the hook 140, which hook is attached to the bottom of the traveling block 120. The quill 145 extends from the top drive 135 and is attached to a saver sub 150, which saver sub is attached to the drill string 155. The drill string 155 is thus suspended within a wellbore 160. The quill 145 may instead be attached directly to the drill string 155. The term "quill" as used herein is not limited to a component which directly extends from the top drive 135, or which is otherwise conventionally referred to as a quill 145. For example, within the scope of the present disclosure, the "quill" may additionally (or alternatively) include a main shaft, a drive shaft, an output shaft, and/or another component which transfers torque, position, and/or rotation from the top drive 135 or other rotary driving element to the drill string 155, at least indirectly. Nonetheless, albeit merely for the sake of clarity and conciseness, these components may be collectively referred to herein as the "quill."

The drill string 155 includes interconnected sections of drill pipe 165, a bottom-hole assembly ("BHA") 170, and a drill bit 175. The BHA 170 may include stabilizers, drill collars, and/or measurement-while-drilling ("MWD") or wireline conveyed instruments, among other components. The drill bit 175 is connected to the bottom of the BHA 170 or is otherwise attached to the drill string 155. One or more mud pumps 180 deliver drilling fluid to the drill string 155 through a hose or other conduit 185, which conduit may be connected to the top drive 135. The downhole MWD or wireline conveyed instruments may be configured for the evaluation of physical properties such as pressure, temperature, torque, weight-on-bit ("WOB"), vibration, inclination, azimuth, toolface orientation in three-dimensional space, and/or other downhole parameters. These measurements may be made downhole, stored in solid-state memory for some time, and downloaded from the instrument(s) at the surface and/or transmitted in real-time or delayed time to the surface. Data transmission methods may include, for example, digitally encoding data and transmitting the encoded data to the surface as pressure pulses in the drilling fluid or mud system. The MWD tools and/or other portions of the BHA 170 may have the ability to store measurements for later retrieval via wireline and/or when the BHA 170 is tripped out of the wellbore 160.

The well system 100 may also include a rotating blow-out preventer ("BOP") 190, such as if the wellbore 160 is being drilled utilizing under-balanced or managed-pressure drilling methods. In such an embodiment, the annulus mud and cuttings may be pressurized at the surface, with the actual desired flow and pressure possibly being controlled by a choke system, and the fluid and pressure being retained at the well head and directed down the flow line to the choke system by the rotating BOP 190. The well system 100 may also include a surface casing annular pressure sensor 195 configured to detect the pressure in the annulus defined between, for example, the wellbore 160 (or casing therein) and the drill string 155. In the embodiment of FIG. 1, the top drive 135 is utilized to impart rotary motion to the drill string 155. However, aspects of the present disclosure are also applicable or readily adaptable to embodiments utilizing other drive systems, such as a power swivel, a rotary table, a coiled tubing unit, a downhole motor, and/or a conventional rotary rig, among others.

The well system 100 also includes a control system 200 configured to control or assist in the control of one or more components of the well system 100—for example, the control system 200 may be configured to transmit operational control signals to the drawworks 130, the top drive 135, the BHA 170 and/or the mud pump(s) 180. The control system 200 may be a stand-alone component installed near the mast 105 and/or other components of the well system 100. In several embodiments, the control system 200 includes one or more systems located in a control room proximate the well system 100, such as the general purpose shelter often referred to as the "doghouse" serving as a combination tool shed, office, communications center, and general meeting place. The control system 200 may be configured to transmit the operational control signals to the drawworks 130, the top drive 135, the BHA 170, and/or the mud pump(s) 180 via wired or wireless transmission. The control system 200 may also be configured to receive electronic signals via wired or wireless transmission from a variety of sensors included in the well system 100, where each sensor is configured to detect an operational characteristic or parameter. The sensors from which the control system 200 is configured to receive electronic signals via wired or wireless transmission may be, include, or be part of one or more of the following: a torque sensor 135*a*, a speed sensor 135*b*, a WOB sensor 135*c*, a downhole annular pressure sensor 170*a*, a shock/vibration sensor 170*b*, a toolface sensor 170*c*, a WOB sensor 170*d*, an MWD survey tool 170*e*, the surface casing annular pressure sensor 195, a mud motor delta pressure ("ΔP") sensor 205*a*, and one or more torque sensors 205*b*.

It is noted that the meaning of the word "detecting," in the context of the present disclosure, may include detecting, sensing, measuring, calculating, and/or otherwise obtaining data. Similarly, the meaning of the word "detect" in the context of the present disclosure may include detect, sense, measure, calculate, and/or otherwise obtain data. The detection performed by the sensors described herein may be performed once, continuously, periodically, and/or at random intervals. The detection may be manually triggered by an operator or other person accessing a human-machine interface (HMI), or automatically triggered by, for example, a triggering characteristic or parameter satisfying a predetermined condition (e.g., expiration of a time period, drilling progress reaching a predetermined depth, drill bit usage reaching a predetermined amount, etc.). Such sensors and/or other detection means may include one or more interfaces which may be local at the well/rig site or located at another, remote location with a network link to the well system 100.

The well system 100 may include any combination of the following: the torque sensor 135*a*, the speed sensor 135*b*, and the WOB sensor 135*c*. The torque sensor 135*a* is coupled to or otherwise associated with the top drive 135—however, the torque sensor 135*a* may alternatively be part of or associated with the BHA 170. The torque sensor 135*a* is configured to detect a value (or range) of the torsion of the quill 145 and/or the drill string 155 in response to, for example, operational forces acting on the drill string 155. The speed sensor 135*b* is configured to detect a value (or range) of the rotational speed of the quill 145. The WOB sensor 135*c* is coupled to or otherwise associated with the top drive 135, the drawworks 130, the crown block 115, the traveling block 120, the drilling line 125 (which includes the dead line anchor), or another component in the load path mechanisms of the well system 100. More particularly, the WOB sensor 135*c* includes one or more sensors different from the WOB sensor 170*d* that detect and calculate weight-on-bit, which can vary from rig to rig (e.g., calculated from a hook load sensor based on active and static hook load).

Further, the well system 100 may additionally (or alternatively) include any combination of the following: the downhole annular pressure sensor 170*a*, the shock/vibration sensor 170*b*, the toolface sensor 170*c*, and the WOB sensor 170*d*. The downhole annular pressure sensor 170*a* is coupled to or otherwise associated with the BHA 170, and may be configured to detect a pressure value or range in the annulus-shaped region defined between the external surface of the BHA 170 and the internal diameter of the wellbore 160 (also referred to as the casing pressure, downhole casing pressure, MWD casing pressure, or downhole annular pressure). Such measurements may include both static annular pressure (i.e., when the mud pump(s) 180 are off) and active annular pressure (i.e., when the mud pump(s) 180 are on). The shock/vibration sensor 170*b* is configured for detecting shock and/or vibration in the BHA 170. The toolface sensor 170*c* is configured to detect the current toolface orientation of the drill bit 175, and may be or include a magnetic toolface sensor which detects toolface orientation relative to magnetic north or true north. In addition, or instead, the toolface sensor 170*c* may be or include a gravity toolface sensor which detects toolface orientation relative to the Earth's gravitational field. In addition, or instead, the toolface sensor 170*c* may be or include a gyro sensor. The WOB sensor 170*d* may be integral to the BHA 170 and is configured to detect WOB at or near the BHA 170.

Further still, the well system 100 may additionally (or alternatively) include the MWD survey tool 170*e* at or near the BHA 170. In several embodiments, the MWD survey tool 170*e* may include any of the sensors 170*a*-170*d* or any combination of these sensors. The BHA 170 and the MWD portion of the BHA 170 (which portion includes the sensors 170*a-d* and the MWD survey tool 170*e*) may be collectively referred to as a "downhole tool." Alternatively, the BHA 170 and the MWD portion of the BHA 170 may each be individually referred to as a "downhole tool." The MWD survey tool 170*e* may be configured to perform surveys along lengths of a wellbore, such as during drilling and tripping operations. The data from these surveys may be transmitted by the MWD survey tool 170*e* to the control system 200 through various telemetry methods, such as mud pulses. In addition, or instead, the data from the surveys may be stored within the MWD survey tool 170*e* or an associated memory. In such embodiments, the survey data may be downloaded to the control system 200 when the MWD survey tool 170*e* is removed from the wellbore or at a maintenance facility at a later time.

Finally, the well system 100 may additionally (or alternatively) include any combination of the following: the mud motor ΔP sensor 205*a* and the torque sensor(s) 205*b*. The mud motor ΔP sensor 205*a* is configured to detect a pressure differential value or range across one or more motors 205 of the BHA 170 and may comprise one or more individual pressure sensors and/or a comparison tool. The motor(s) 205 may each be or include a positive displacement drilling motor that uses hydraulic power of the drilling fluid to drive the drill bit 175 (also known as a mud motor). The torque sensor(s) 205*b* may also be included in the BHA 170 for sending data to the control system 200 that is indicative of the torque applied to the drill bit 175 by the motor(s) 205.

Figure 2:
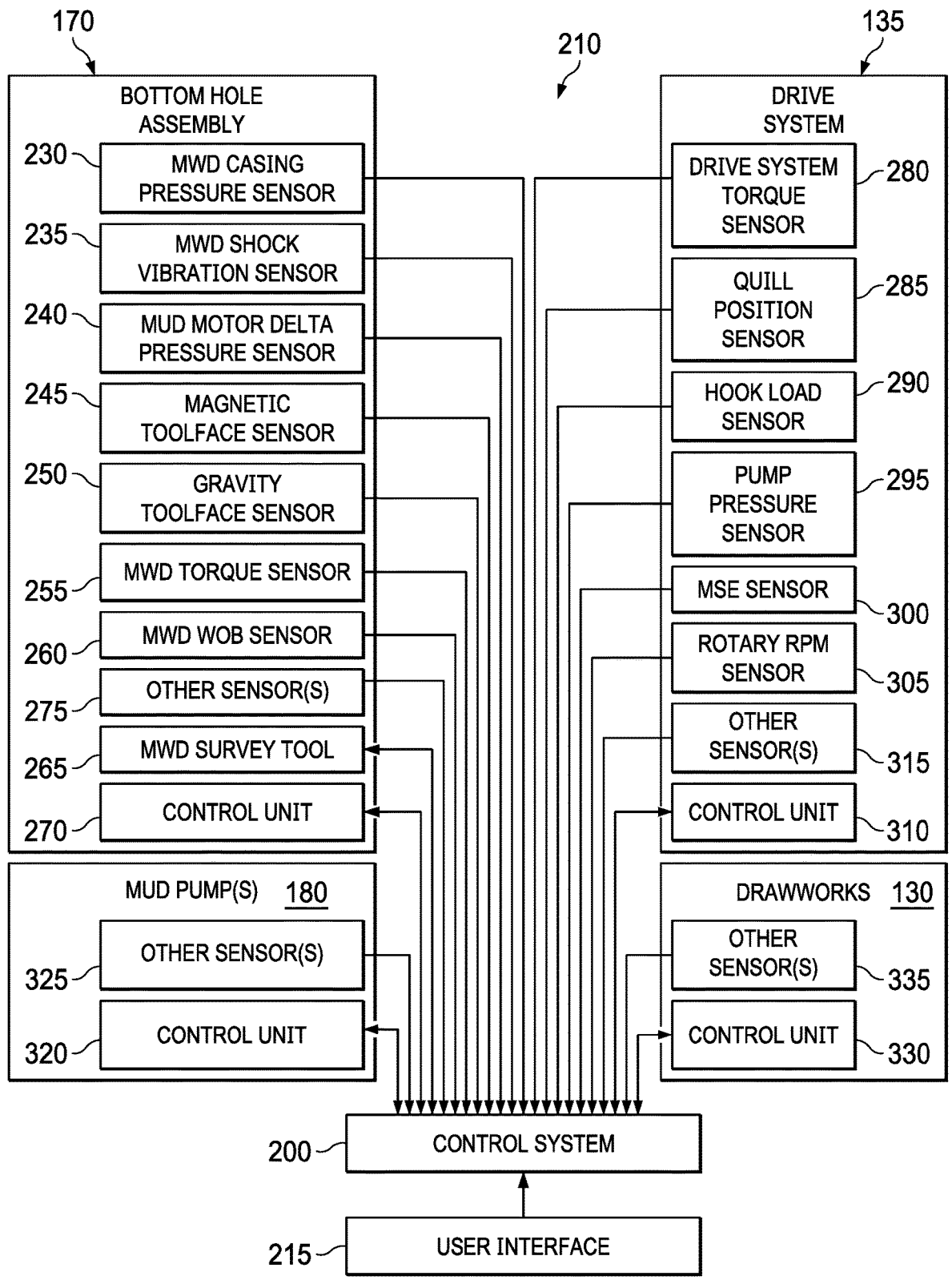
FIG. 2 is a diagrammatic view of a well system that may be, include, or be part of the well system of FIG. 1, according to one or more embodiments of the present disclosure.

In an embodiment, as illustrated in FIG. 2, a well system is generally referred to by the reference numeral 210 and includes one or more components of the well system 100. More particularly, the well system 210 may include at least respective parts of the well system 100, including, but not limited to, the control system 200, the drawworks 130, the top drive 135 (identified as a "drive system" in FIG. 2), the BHA 170, and the mud pump(s) 180. The well system 210 may be implemented within the environment and/or the well system 100 of FIG. 1. As such, the well system 100 and/or the well system 210 may be individually or collectively referred to as a "well system," a "drilling system," a "drilling rig," or the like. As shown in FIG. 2, the control system 200 includes a user-interface 215 adapted to communicate therewith—depending on the embodiment, the control system 200 and the user-interface 215 may be discrete components that are interconnected via a wired or wireless link. The user-interface 215 and the control system 200 may additionally (or alternatively) be integral components of a single system.

Figure 3:
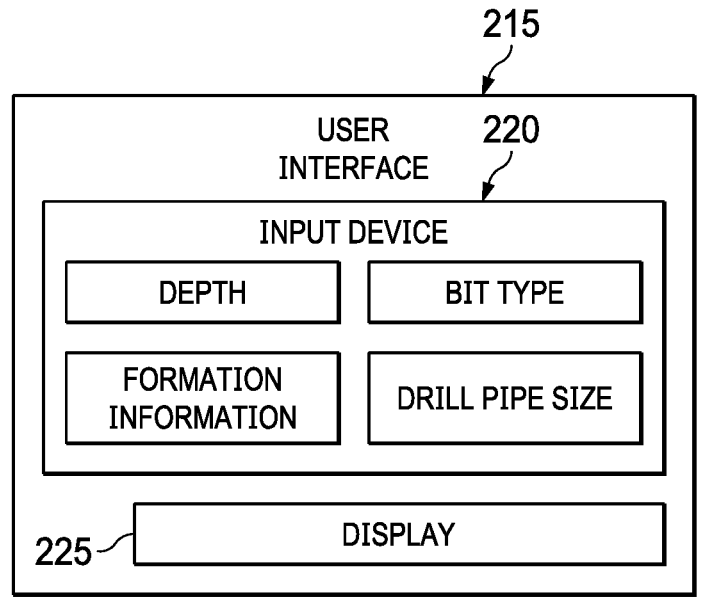
FIG. 3 is a diagrammatic view of a user interface of the well system of FIG. 2, according to one or more embodiments of the present disclosure.

Turning to FIG. 3, in one or more embodiments the user-interface 215 may include an input mechanism 220 that permits a user to input drilling settings or parameters such as, for example, left and right oscillation revolution settings (these settings control the drive system to oscillate a portion of the drill string 155), acceleration, toolface setpoints, rotation settings, a torque target value (such as a previously calculated torque target value that may determine the limits of oscillation), information relating to the drilling parameters of the drill string 155 (such as BHA information or arrangement, drill pipe size, bit type, depth, and formation information), and/or other setpoints and input data. The input mechanism 220 may include a keypad, voice-recognition apparatus, dial, button, switch, slide selector, toggle, joystick, mouse, database, and/or any other suitable data input device. The input mechanism 220 may support data input from local and/or remote locations. In addition, or instead, the input mechanism 220, when included, may permit user-selection of predetermined profiles, algorithms, setpoint values or ranges, such as via one or more drop-down menus—this data may instead (or in addition) be selected by the control system 200 via the execution of one or more database look-up procedures. In general, the input mechanism 220 and/or other components within the scope of the present disclosure support operation and/or monitoring from stations on the rig site as well as one or more remote locations with a communications link to the system, network, local area network ("LAN"), wide area network ("WAN"), Internet, satellite-link, and/or radio, among other suitable techniques or systems. The user-interface 215 may also include a display unit 225 for visually presenting information to the user in textual, graphic, or video form. The display unit 225 may be utilized by the user to input drilling parameters, limits, or setpoint data in conjunction with the input mechanism 220—for example, the input mechanism 220 may be integral to or otherwise communicably coupled with the display unit 225. The control system 200 may be configured to receive data or information from the user, the drawworks 130, the top drive 135, the BHA 170, and/or the mud pump(s) 180—the control system 200 processes such data or information to enable effective and efficient drilling.

Turning back to FIG. 2, in one or more embodiments the BHA 170 includes one or more sensors (typically a plurality of sensors) located and configured about the BHA 170 to detect parameters relating to the drilling environment, the condition and orientation of the BHA 170, and/or other information. For example, the BHA 170 may include an MWD casing pressure sensor 230, an MWD shock/vibration sensor 235, a mud motor ΔP sensor 240, a magnetic toolface sensor 245, a gravity toolface sensor 250, an MWD torque sensor 255, and an MWD weight-on-bit ("WOB") sensor 260—in several embodiments, one or more of these sensors is, includes, or is part of the following sensor(s) shown in FIG. 1: the downhole annular pressure sensor 170*a*, the shock/vibration sensor 170*b*, the toolface sensor 170*c*, the WOB sensor 170*d*, the mud motor ΔP sensor 205*a*, and/or the torque sensor(s) 205*b*.

The MWD casing pressure sensor 230 is configured to detect an annular pressure value or range at or near the MWD portion of the BHA 170. The MWD shock/vibration sensor 235 is configured to detect shock and/or vibration in the MWD portion of the BHA 170. The mud motor ΔP sensor 240 is configured to detect a pressure differential value or range across the mud motor of the BHA 170. The magnetic toolface sensor 245 and the gravity toolface sensor 250 are cooperatively configured to detect the current toolface orientation. In several embodiments, the magnetic toolface sensor 245 is or includes a magnetic toolface sensor that detects toolface orientation relative to magnetic north or true north. In several embodiments, the gravity toolface sensor 250 is or includes a gravity toolface sensor that detects toolface orientation relative to the Earth's gravitational field. In several embodiments, the magnetic toolface sensor 245 detects the current toolface when the end of the wellbore 160 is less than about 7° from vertical, and the gravity toolface sensor 250 detects the current toolface when the end of the wellbore 160 is greater than about 7° from vertical. Other toolface sensors may also be utilized within the scope of the present disclosure that may be more or less precise (or have the same degree of precision), including non-magnetic toolface sensors and non-gravitational inclination sensors. The MWD torque sensor 255 is configured to detect a value or range of values for torque applied to the bit by the motor(s) of the BHA 170. The MWD weight-on-bit ("WOB") sensor 260 is configured to detect a value (or range of values) for WOB at or near the BHA 170.

The following data may be sent to the control system 200 via one or more signals, such as, for example, electronic signal via wired or wireless transmission, mud-pulse telemetry, another signal, or any combination thereof: the casing pressure data detected by the MWD casing pressure sensor 230, the shock/vibration data detected by the MWD shock/vibration sensor 235, the pressure differential data detected by the mud motor ΔP sensor 240, the toolface orientation data detected by the toolface sensors 245 and 250, the torque data detected by the MWD torque sensor 255, and/or the WOB data detected by the MWD WOB sensor 260. The pressure differential data detected by the mud motor ΔP sensor 240 may alternatively (or additionally) be calculated, detected, or otherwise determined at the surface, such as by calculating the difference between the surface standpipe pressure just off-bottom and the pressure measured once the bit touches bottom and starts drilling and experiencing torque.

The BHA 170 may also include an MWD survey tool 265—in several embodiments, the MWD survey tool 265 is, includes, or is part of the MWD survey tool 170e shown in FIG. 1. The MWD survey tool 265 may be configured to perform surveys at intervals along the wellbore 160, such as during drilling and tripping operations. The MWD survey tool 265 may include one or more gamma ray sensors that detect gamma data. The data from these surveys may be transmitted by the MWD survey tool 265 to the control system 200 through various telemetry methods, such as mud pulses. In other embodiments, survey data is collected and stored by the MWD survey tool 265 in an associated memory. This data may be uploaded to the control system 200 at a later time, such as when the MWD survey tool 265 is removed from the wellbore 160 or during maintenance. Some embodiments use alternative data gathering sensors or obtain information from other sources. For example, the BHA 170 may include sensors for making additional measurements, including, for example and without limitation, azimuthal gamma data, neutron density, porosity, and resistivity of surrounding formations. In several embodiments, such information may be obtained from third parties or may be measured by systems other than the BHA 170.

The BHA 170 may include a memory and a transmitter. In several embodiments, the memory and transmitter are integral parts of the MWD survey tool 265, while in other embodiments, the memory and transmitter are separate and distinct modules. The memory may be any type of memory device, such as a cache memory (e.g., a cache memory of the processor), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, or other forms of volatile and non-volatile memory. The memory may be configured to store readings and measurements for some period of time. In several embodiments, the memory is configured to store the results of surveys performed by the MWD survey tool 265 for some period of time, such as the time between drilling connections, or until the memory may be downloaded after a tripping out operation. The transmitter may be any type of device to transmit data from the BHA 170 to the control system 200, and may include a mud pulse transmitter. In several embodiments, the MWD survey tool 265 is configured to transmit survey results in real-time to the surface through the transmitter. In other embodiments, the MWD survey tool 265 is configured to store survey results in the memory for a period of time, access the survey results from the memory, and transmit the results to the control system 200 through the transmitter.

In several embodiments, the BHA 170 also includes a control unit 270 for controlling the rotational position, speed, and direction of the rotary drilling bit or toolface. The control unit 270 may be, include, or be part of the control system 200, or another control system. The BHA 170 may also include other sensor(s) 275 such as, for example, other MWD sensors, other LWD sensors, other downhole sensors, back-up/redundant sensors, one or more sensors repurposed, repositioned, or reproduced from one or more of the top drive 135, the drawworks 130, and/or the mud pump(s) 180, and/or or any combination thereof.

The top drive 135 includes one or more sensors (typically a plurality of sensors) located and configured about the top drive 135 to detect parameters relating to the condition and orientation of the drill string 155, and/or other information. For example, the top drive 135 may include a rotary torque sensor 280, a quill position sensor 285, a hook load sensor 290, a pump pressure sensor 295, a mechanical specific energy ("MSE") sensor 300, and a rotary RPM sensor 305—in several embodiments, one or more of these sensors is, includes, or is part of the following sensor(s) shown in FIG. 1: the torque sensor 135a, the speed sensor 135b, the WOB sensor 135c, and/or the casing annular pressure sensor 195. In addition to, or instead of, being included as part of the drive system 135, the pump pressure sensor 295 may be included as part of the mud pump(s) 180. In several embodiments, the top drive 135 also includes a control unit 310 for controlling the rotational position, speed, and direction of the quill 145 and/or another component of the drill string 155 coupled to the top drive 135. The control unit 310 may be, include, or be part of the control system 200, or another control system. The top drive 135 may also include other sensor(s) 315 such as, for example, other top drive sensors, other surface sensors, back-up/redundant sensors, one or more sensors repurposed, repositioned, or reproduced from one or more of the BHA 170, the drawworks 130, and/or the mud pump(s) 180, and/or or any combination thereof.

The rotary torque sensor 280 is configured to detect a value (or range of values) for the reactive torsion of the quill 145 or the drill string 155. The quill position sensor 285 is configured to detect a value (or range of values) for the rotational position of the quill 145 (e.g., relative to true north or another stationary reference). The hook load sensor 290 is configured to detect the load on the hook 140 as it suspends the top drive 135 and the drill string 155. The pump pressure sensor 295 is configured to detect the pressure of the mud pump(s) 180 providing mud or otherwise powering the BHA 170 from the surface. In several embodiments, rather than being included as part of the top drive 135, the pump pressure sensor 295 may be incorporated into, or included as part of, the mud pump(s) 180. The MSE sensor 300 is configured to detect the MSE representing the amount of energy required per unit volume of drilled rock—in several embodiments, the MSE is not directly detected, but is instead calculated at the control system 200 (or another control system or control unit) based on sensed data. The rotary RPM sensor 305 is configured to detect the rotary RPM of the drill string 155—this may be measured at the top drive 135 or elsewhere (e.g., at surface portion of the drill string 155). The following data may be sent to the control system 200 via one or more signals, such as, for example, electronic signal via wired or wireless transmission: the rotary torque data detected by the rotary torque sensor 280, the quill position data detected by the quill position sensor 285, the hook load data detected by the hook load sensor 290, the pump pressure data detected by the pump pressure sensor 295, the MSE data detected (or calculated) by the MSE sensor 300, and/or the RPM data detected by the RPM sensor 305.

The mud pump(s) 180 may include a control unit 320 and/or other means for controlling the pressure and flow rate of the drilling mud produced by the mud pump(s) 180—such control may include torque and speed control of the mud pump(s) 180 to manipulate the pressure and flow rate of the drilling mud and the ramp-up or ramp-down rates of the mud pump(s) 180. In several embodiments, the control unit 320 is, includes, or is part of the control system 200. The mud pump(s) 180 may also include other sensor(s) 325 such as, for example, the pump pressure sensor 295, one or more pump flow sensors, other mud pump sensors, other surface sensors, back-up/redundant sensors, one or more sensors repurposed, repositioned, or reproduced from one or more of the BHA 170, the top drive 135, and/or the drawworks 130, and/or or any combination thereof.

The drawworks 130 may include a control unit 330 and/or other means for controlling feed-out and/or feed-in of the drilling line 125 (shown in FIG. 1)—such control may include rotational control of the drawworks to manipulate the height or position of the hook and the rate at which the hook ascends or descends. The drill string feed-off system of the drawworks 130 may instead be a hydraulic ram or rack and pinion type hoisting system rig, where the movement of the drill string 155 up and down is facilitated by something other than a drawworks. The drill string 155 may also take the form of coiled tubing, in which case the movement of the drill string 155 in and out of the wellbore 160 is controlled by an injector head which grips and pushes/pulls the tubing in/out of the wellbore 160. Such embodiments still include a version of the control unit 330 configured to control feed-out and/or feed-in of the drill string 155. In several embodiments, the control unit 330 is, includes, or is part of the control system 200. The drawworks 130 may also include other sensor(s) 335 such as, for example, other drawworks sensors, other surface sensors, back-up/redundant sensors, one or more sensors repurposed, repositioned, or reproduced from one or more of the BHA 170, the top drive 135, and/or the drawworks 130, and/or or any combination thereof.

The control system 200 may be configured to receive data or information relating to one or more of the above-described parameters from the user-interface 215, the BHA 170 (including the MWD survey tool 265), the top drive 135, the mud pump(s) 180, and/or the drawworks 130, as described above, and to utilize such information to enable effective and efficient drilling. In several embodiments, the parameters are transmitted to the control system 200 by one or more data channels. In several embodiments, each data channel may carry data or information relating to a particular sensor or combination of sensors. The control system 200 may be further configured to generate a control signal, such as via intelligent adaptive control, and provide the control signal to the top drive 135, the mud pump(s) 180, the drawworks 130, and/or the BHA 170 to adjust and/or maintain one or more of the following: the rotational position, speed, and direction of the quill 145 and/or another component of the drill string 155 coupled to the top drive 135, the pressure and flow rate of the drilling mud produced by the mud pump(s) 180, the feed-out and/or feed-in of the drilling line 125, and/or the rotational position, speed, and direction of the rotary drilling bit or toolface. Moreover, one or more of the control unit 270 of the BHA 170 the control unit 310 of the top drive 135, the control unit 320 of the mud pump(s) 180, and/or the control unit 330 of the drawworks 130 may be configured to generate and transmit signals to the control system 200—these signals influence the control of the BHA 170, the top drive 135, the mud pump(s) 180, and/or the drawworks 130. In addition, or instead, any one of the control units 270, 310, 320, and 330 may be configured to generate and transmit signals to another one of the control units 270, 310, 320, or 330, whether directly or via the control system 200—as a result, any combination of the control units 270, 310, 320, and 330 may be configured to cooperate in controlling the BHA 170, the top drive 135, the mud pump(s) 180, and/or the drawworks 130.

Figure 4:
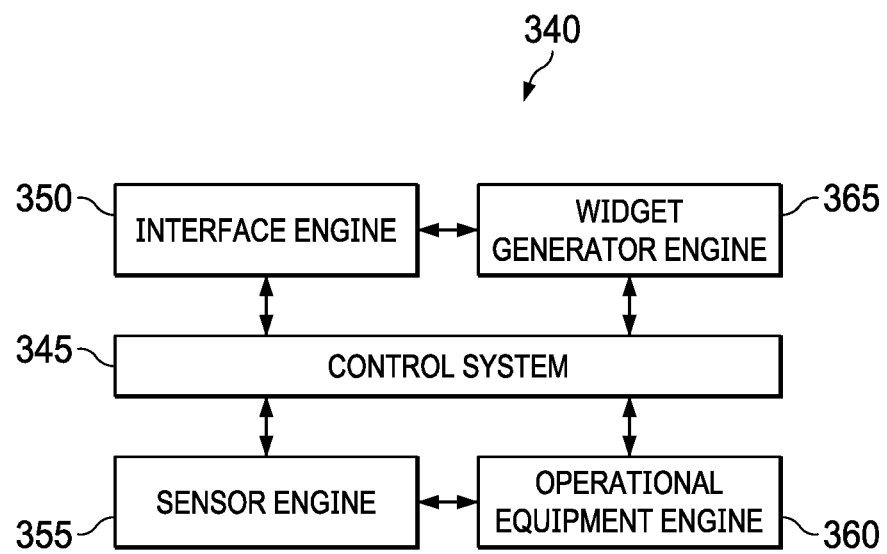
FIG. 4 is a diagrammatic view of a well system that may be, include, or be part of the well system of FIG. 1 and/or the well system of FIG. 2, according to one or more embodiments of the present disclosure.

In an embodiment, as illustrated in FIG. 4, a well system is generally referred to by the reference numeral 340 and includes one or more components of the well system 100 and/or the well system 210. More particularly, the well system 340 may include at least respective parts of the well system 100 and/or the well system 210, including, but not limited to, the control system 200, the drawworks 130, the top drive 135, the BHA 170, and the mud pump(s) 180. The well system 340 may be implemented within the environment and/or the well system 100 of FIG. 1, and/or within the environment and/or the well system 210 of FIG. 2. As such, the well system 100, the well system 210, and/or the well system 340 may be individually or collectively referred to as a "well system," a "drilling system," a "drilling rig," or the like. The well system includes a control system 345. In several embodiments, the control system 345 is, includes, or is part of the control system 200 shown in FIGS. 1 and 2. As a result, the control system 345 may include a combination (or sub-combination) of the control units 270, 310, 320, and 330. The control system 345 is coupled to, and adapted to communicate with, an interface engine 350, a sensor engine 355, an operational equipment engine 360, and a graphical widget generator engine 365. The interface engine 350 is operably coupled to, and adapted to communicate with, the graphical widget generator engine 365. The sensor engine 355 is operably coupled to, and adapted to communicate with, the operational equipment engine 360. The control system 345 may include or be part of one, or any combination, of the interface engine 350, the sensor engine 355, the operational equipment engine 360, and/or the graphical widget generator engine 365.

The term "engine" is meant herein to refer to an agent, instrument, or combination of either, or both, agents and instruments that may be associated to serve a purpose or accomplish a task—agents and instruments may include sensors, actuators, switches, relays, valves, power plants, system wiring, equipment linkages, specialized operational equipment, computers, components of computers, programmable logic devices, microprocessors, software, software routines, software modules, communication equipment, networks, network services, and/or other elements and their equivalents that contribute to the purpose or task to be accomplished by the engine. Accordingly, some of the engines may be software modules or routines, while others of the engines may be hardware and/or equipment elements in communication with the control system 345. The control system 345 operates to control the interaction of data with and between the other components of the well system 340.

The interface engine 350 includes at least one input and output device or system that enables a user to interact with the control system 345 and the functions that the control system 345 provides. In several embodiments, the interface engine 350 includes at least the following component: the user-interface 215 (shown in FIGS. 2 and 3). However, the interface engine 350 may have multiple user stations, which may include a video display, a keyboard, a pointing device, a document scanning/recognition device, or other device configured to receive an input from an external source, which may be connected to a software process operating as part of a computer or local area network. The interface engine 350 may include externally positioned equipment configured to input data into the control system 345. Data entry may be accomplished through various forms, including raw data entry, data transfer, or document scanning coupled with a character recognition process, for example. The interface engine 350 may include a user station that has a display with touch-screen functionality, so that a user may receive information from the well system 340, and provide input to the well system 340 directly via the display or touch screen. Other examples of sub-components that may be part of the interface engine 350 include, but are not limited to, audible alarms, visual alerts, telecommunications equipment, and computer-related components, peripherals, and systems.

Sub-components of the interface engine 350 may be positioned in various locations within an area of operation, such as on a drilling rig at a drill site. Sub-components of the interface engine 350 may also be remotely located away from the general area of operation, for example, at a business office, at a sub-contractor's office, in an operations manager's mobile phone, and in a sub-contractor's communication linked personal data appliance. A wide variety of technologies would be suitable for providing coupling of various sub-components of the interface engine 350 and the interface engine 350 itself to the control system 345. In several embodiments, the operator may thus be remote from the interface engine 350, such as through a wireless or wired internet connection, or a portion of the interface engine 350 may be remote from the rig, or even the wellsite, and be proximate a remote operator, and the portion thus connected through, e.g., an internet connection, to the remainder of the on-site components of the interface engine 350.

The sensor engine 355 may include devices such as sensors, meters, detectors, or other devices configured to measure or sense a parameter related to a component of a well drilling operation—in several embodiments, the sensor engine 355 includes one or more of the following components (shown in FIGS. 1 and 2), among others: the torque sensor 135a, the speed sensor 135b, the WOB sensor 135c, the downhole annular pressure sensor 170a, the shock/vibration sensor 170b, the toolface sensor 170c, the WOB sensor 170d, the MWD survey tool 170e, the surface casing annular pressure sensor 195, the mud motor ΔP sensor 205a, the torque sensor(s) 205b, the MWD casing pressure sensor 230, the MWD shock/vibration sensor 235, the mud motor ΔP sensor 240, the magnetic toolface sensor 245, the gravity toolface sensor 250, the MWD torque sensor 255, the MWD WOB sensor 260, the MWD survey tool 265, the other sensor(s) 275, the rotary torque sensor 280, the quill position sensor 285, the hook load sensor 290, the pump pressure sensor 295, the MSE sensor 300, and the rotary RPM sensor 305, the other sensor(s) 315, the other sensor(s) 325, and the other sensor(s) 335. The sensors or other detection devices are generally configured to sense or detect activity, conditions, and circumstances in an area to which the device has access. These sensors may be located on the surface or downhole, and configured to transmit information to the surface through a variety of methods.

Sub-components of the sensor engine 355 may be deployed at any operational area where information on the execution of one or more drilling operations may occur. Readings from the sensor engine 355 are fed back to the control system 345. The reported data may include the sensed data, or may be derived, calculated, or inferred from sensed data. Sensed data may be that concurrently collected, recently collected, or historically collected, at that wellsite or an adjacent wellsite. The control system 345 may send signals to the sensor engine 355 to adjust the calibration or operational parameters in accordance with a control program in the control system 345, which control program is generally based upon the objectives set forth in the well plan. Additionally, the control system 345 may generate outputs that control the well drilling operation, as will be described in further detail below. The control system 345 receives and processes data from the sensor engine 355 or from other suitable source(s), and monitors the rig and conditions on the rig based on the received data.

The operational equipment engine 360 may include a plurality of devices configured to facilitate accomplishment of the objectives set forth in the well plan—in several embodiments, the operational equipment engine 360 includes one or more components of Figure 1's well system 100 and/or FIG. 2's well system 210. For example, the operational equipment engine 360 may include the drawworks 130, the top drive 135, the BHA 170, the mud pump(s) 180, and/or the control system 200. The objective of the operational equipment engine 360 is to drill a well in accordance with the specifications set forth in the well plan. Therefore, the operational equipment engine 360 may include hydraulic rams, rotary drives, valves, solenoids, agitators, drives for motors and pumps, control systems, and any other tools, machines, equipment, or the like that would be required to drill the well in accordance with the well plan. The operational equipment engine 360 may be designed to exchange communication with control system 345, so as to not only receive instructions, but to provide information on the operation of the operational equipment engine 360 apart from any associated sensor engine 355. For example, encoders associated with the top drive 135 may provide rotational information regarding the drill string 165, and hydraulic links may provide height, positional information, or a change in height or positional information. The operational equipment engine 360 may be configured to receive control inputs from the control system 345 and to control the well drilling operation (i.e., the components conducting the well drilling operation) in accordance with the received inputs from the control system 345.

The control system 345, the interface engine 350, the sensor engine 355, and the operational equipment engine 360 should be fully integrated with the well plan to assure proper operation and safety. Moreover, measurements of the rig operating parameters (block position, hook load, pump pressure, slips set, etc.) should have a high level of accuracy to enable proper accomplishment of the well plan with minimal or no human intervention once the operational parameters are selected and the control limits are set for a given drilling operation, and the trigger(s) are pre-set to initiate the operation.

Figure 5:
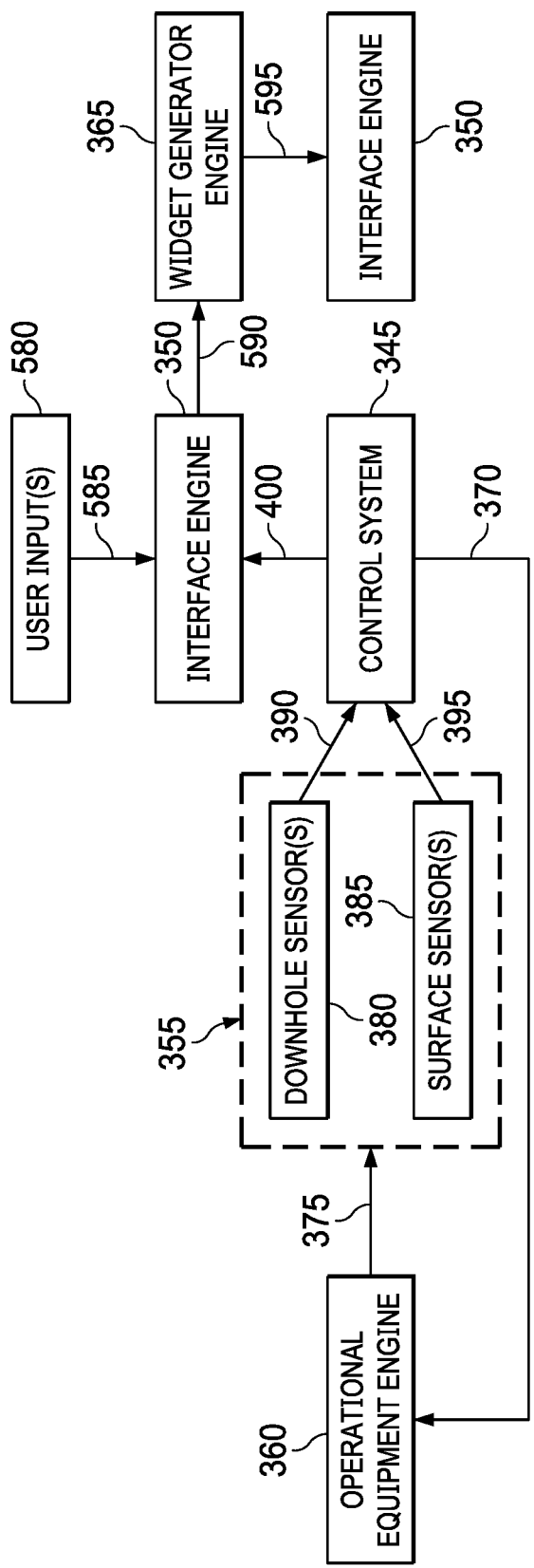
FIG. 5 is a diagrammatic view of the well system of FIGS. 1, 2, and/or 4 in operation, according to one or more embodiments of the present disclosure.

In operation, as illustrated in FIG. 5 with continuing reference to FIGS. 1-4, the control system 345 is adapted to send control signals to the operational equipment engine 360, as indicated by arrow 370. Based on the control signals, the operational equipment engine 360 is adapted to execute the well plan to drill a segment of the wellbore 160. During the drilling of the well segment by the operational equipment engine 360, the sensor engine 355 is adapted to monitor various components and/or operational parameters of the operational equipment engine 360, as indicated by arrow 375. More particularly, in several embodiments, the sensor engine 355 is adapted to detect first and second drilling conditions using the sensor engine 355. The first and second drilling conditions may be detected by separate sensors, and may be either different drilling conditions or the same drilling condition. In at least one such embodiment, as shown in FIG. 5, one of the first and second sensors may be a downhole sensor 380 and the other of the first and second sensors may be a surface sensor 385. The downhole sensor 380 is adapted to send a first data stream to the control system 345, as indicated by the arrow 390 (e.g., over a first data channel). The first data stream is based on the detected first drilling condition over a time interval (e.g., differential pressure). The surface sensor 385 is adapted to send a second data stream to the control system 345, as indicated by arrow 395 (e.g., over a second data channel). The second data stream is based on the second detected drilling condition over the time interval (e.g., weight-on-bit).

Although described as being sent from the downhole sensor 380 and the surface sensor 385, respectively, the first and second data streams may instead be sent from any pair of sensors described herein. Accordingly, the first and second data streams may be sent from a pair of surface sensors, a pair of downhole sensors, or a downhole sensor and a surface sensor, respectively (as described above). For example, the first drilling condition may be hook load detected by the WOB sensor 135c and/or the hook load sensor 290, and the second drilling condition may be weight-on-bit detected by the WOB sensor 170d and/or the MWD WOB sensor 260. For another example, the first drilling condition may be hook load detected by the WOB sensor 135c and/or the hook load sensor 290, and the second drilling condition may be differential pressure detected by the mud motor ΔP sensor 205a, and/or the mud motor ΔP sensor 240. In several embodiments, the first and second data streams are then sent to the interface engine 350 and displayed to a user, as indicated by arrow 400.

Figures 1, 6A:
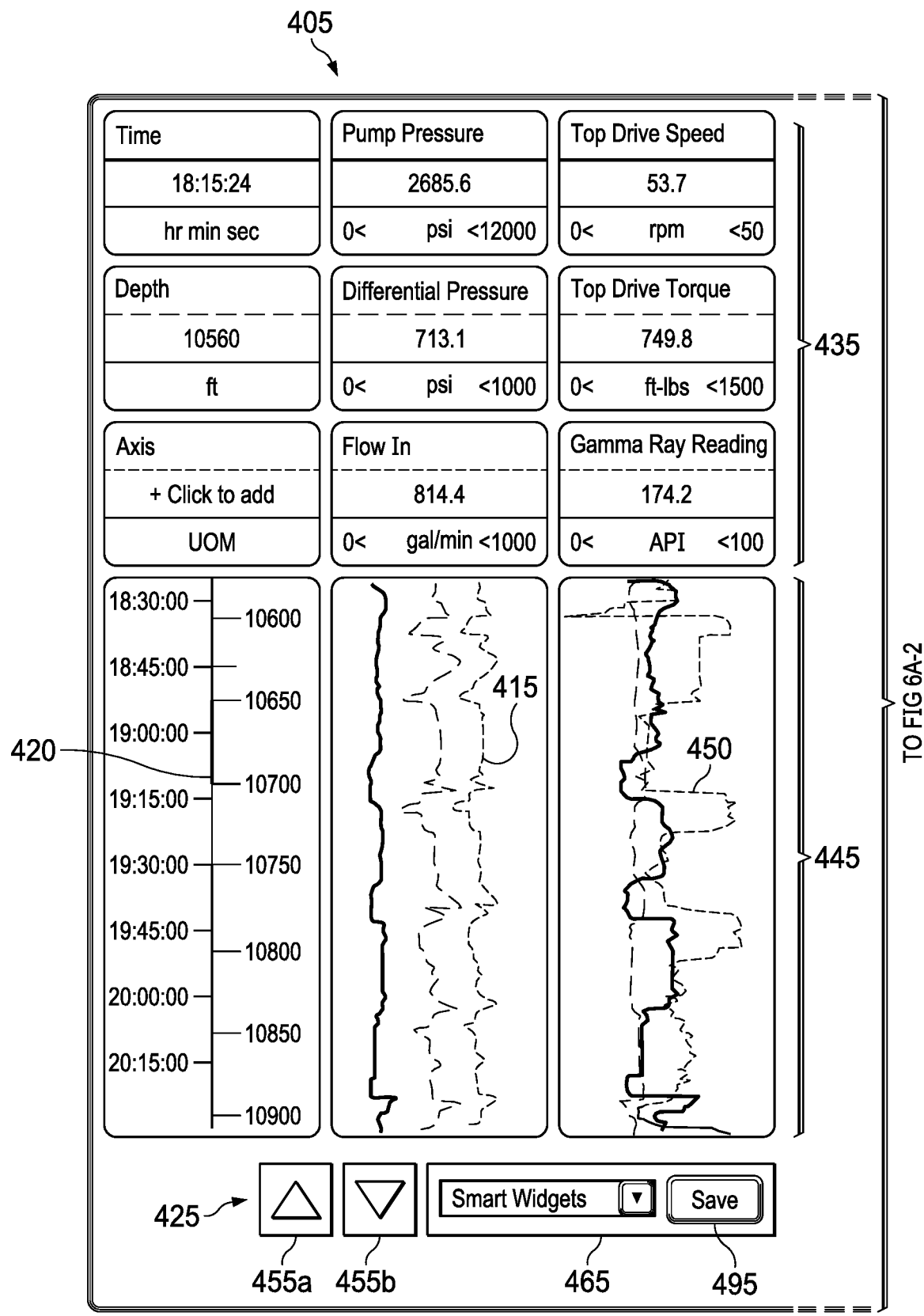
Figures 2, 6A:
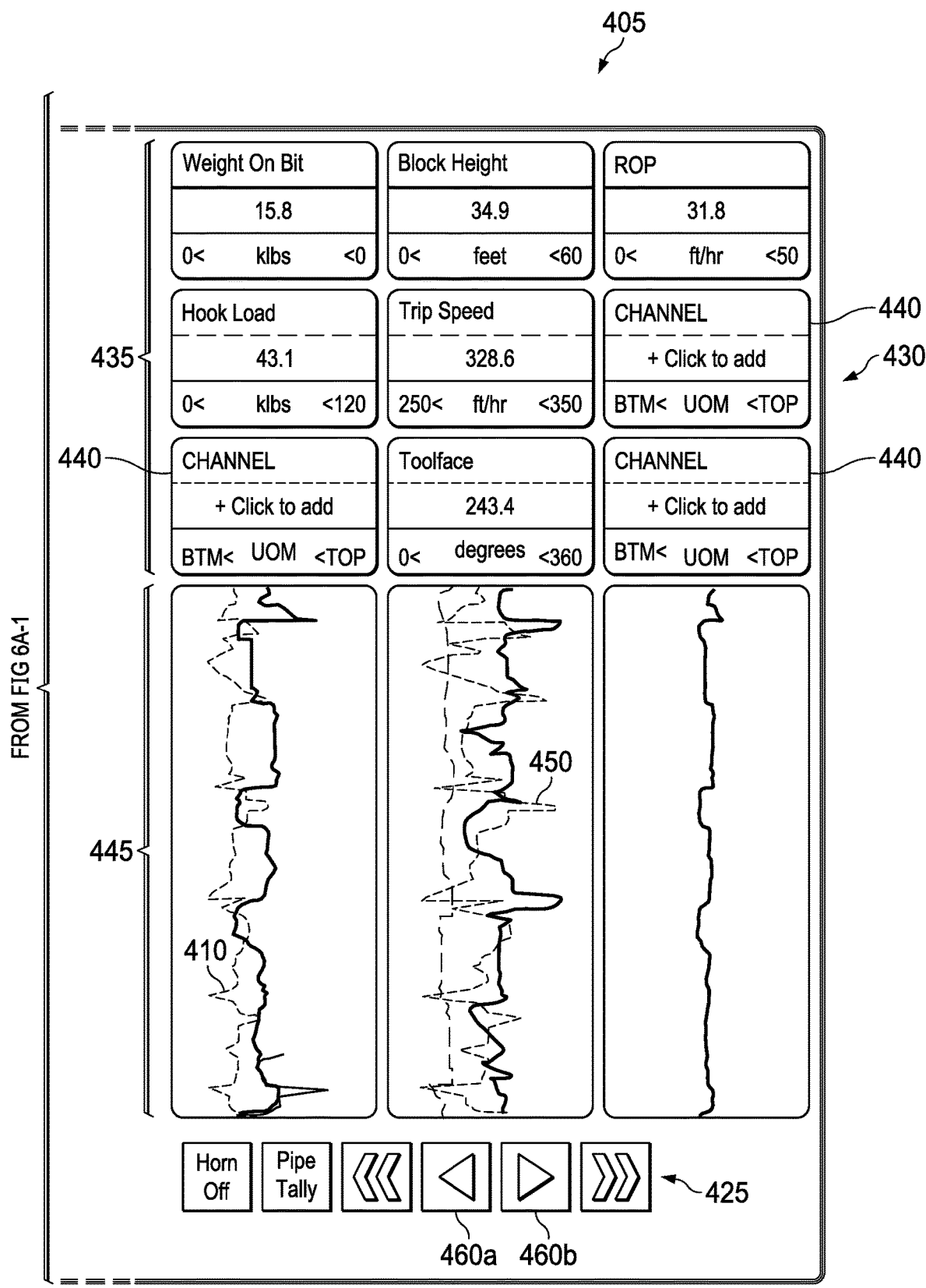

An example graphical user interface 405 generated as a result of the first and second data streams being sent to the interface engine 350 is illustrated in FIGS. 6A-1 and 6A-2. As shown in FIGS. 6A-1 and 6A-2, the first and second data streams are generally referred to by the reference numerals 410 and 415, respectively, and may be displayed adjacent or near one another against a time axis 420 (and/or a depth axis). For example, as shown in FIGS. 6A-1 and 6A-2, in some instances, the first data stream 410 may be weight-on-bit and the second data stream 415 may be differential pressure. Other data streams are also sent by the sensor engine 355 and received over other channels by the control system 345. Accordingly, these other data streams may be displayed on the graphical user interface 405 adjacent or near the first and second data streams 410 and 415 against the time axis 420 (and/or the depth axis), as shown in FIGS. 6A-1 and 6A-2. Examples of such other data streams may include, but are not limited to, pump pressure (e.g., detected by the pump pressure sensor 295), differential pressure (e.g., detected by the mud motor ΔP sensor 205a and/or the mud motor ΔP sensor 240), flow in, top drive speed (e.g., detected by the speed sensor 135b and/or the rotary RPM sensor 305), top drive torque (e.g., detected by the torque sensor 135a and/or the rotary torque sensor 280), gamma ray reading, weight-on-bit (e.g., detected by the WOB sensor 170d and/or the MWD WOB sensor 260), hook load (e.g., detected by the WOB sensor 135c and/or the hook load sensor 290), block height, trip speed, toolface orientation (e.g., detected by the toolface sensor 170c, the magnetic toolface sensor 245, and/or the gravity toolface sensor 250), and rate of penetration ("ROP"), among others. As a result, as mentioned above, rather than the first data stream 410 being weight-on-bit and the second data stream 415 being differential pressure, the first and second data streams 410 and 415 may instead be sent from any of the other sensors described herein over a pair of corresponding channels to the control system 345.

The graphical user interface 405 includes a task bar 425 and a display pane 430. The display pane 430 includes a gauge region 435 that displays absolute values of the various data streams (including the first and second data streams 410 and 415) received from the sensor engine 355. The gauge region 435 of the display pane 430 includes a plurality of gauges 440 displaying real time readings from various sensors of the sensor engine 355. The gauge region 435 may be configurable to a certain degree by the user; for example, any unused gauges 440 in the gauge region 435 may be configured by the user to display real time readings of any available user-selected data stream/channel. The display pane 430 also includes a graph region 445 that displays graphs 450 of the various readings of the gauges 440 in the gauge region 435 as a function of time (and/or depth). The task bar 425 includes up and down buttons 455a and 455b to permit users to scroll along the time axis 420 (and/or the depth axis) in the graph region 445 to review historical information associated with the multiple data streams/channels displayed in the display pane 430. The task bar 425 also includes left and right buttons 460a and 460b to permit users to scroll between different display panes, as will be described in further detail below. The task bar 425 includes a "graphical widget" menu 465 (shown in FIG. 6A-1) to enable the creation of new and customizable graphical widgets by users, as will be described in further detail below.

Figure 6B:
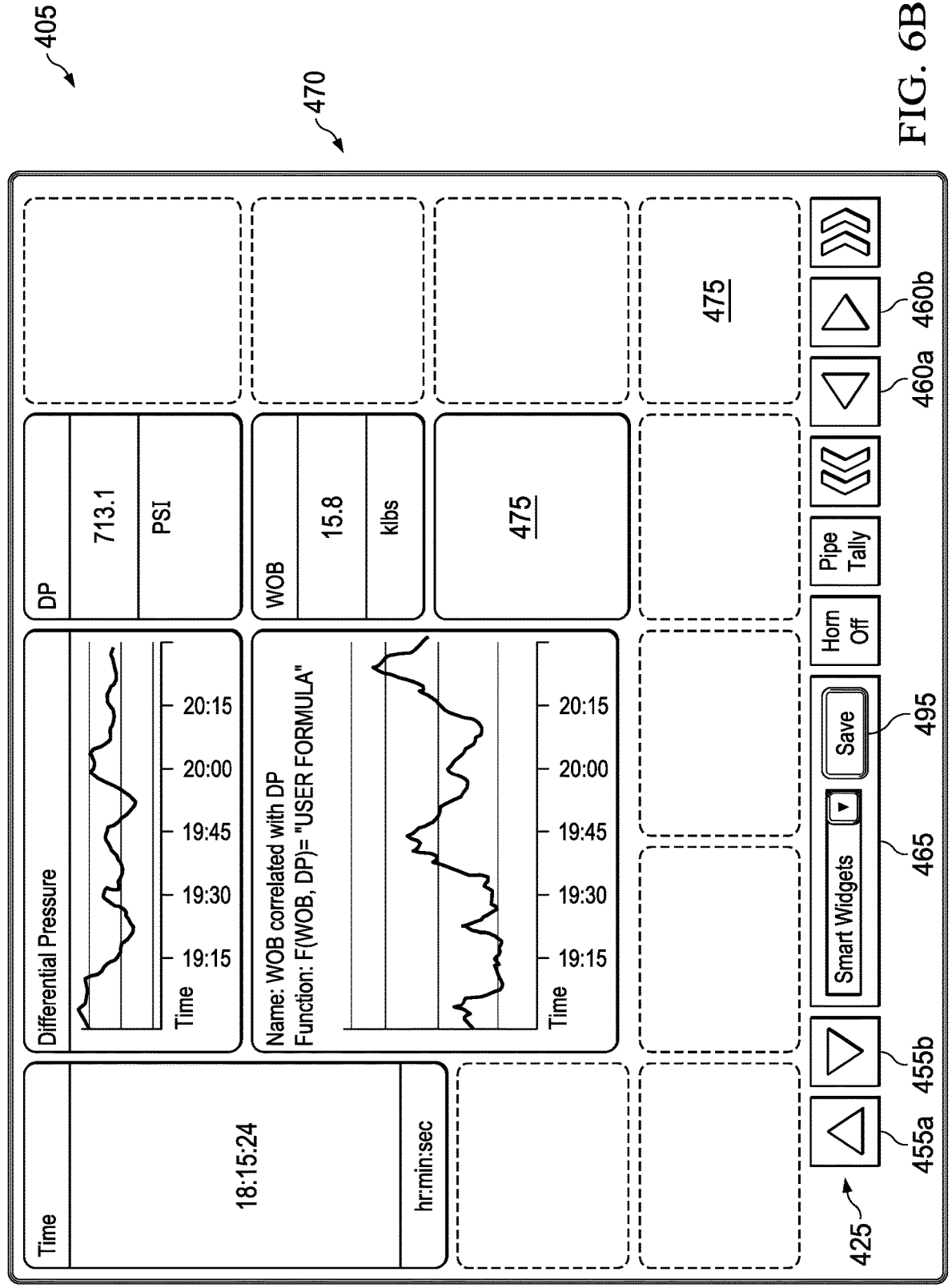
FIG. 6B is a graphical view of another display pane of the user interface of FIGS. 6A-1 and 6A-2 displayed during at least a portion of the well system operation shown in FIG. 5, according to one or more embodiments of the present disclosure.

In an embodiment, as illustrated in FIG. 6B with continuing reference to FIGS. 6A-1 and 6A-2, the "graphical widget" menu 465 enables the creation of new and customizable graphical widgets by users for display in a display pane 470 of the graphical user interface 405. In several embodiments, the display panes 430 and 470 may be accessible to users on a single display unit (e.g., the display unit 225) through the use of the left and right buttons 460a and 460b (i.e., users can scroll between the display panes 430 and 470). In addition, or instead, the display panes 430 and 470 may be displayed to users on separate display units (e.g., the display unit 225 and another display unit either near or remote from the drilling rig). In several embodiments, the display pane 470 includes a plurality of display tiles 475. The display tiles 475 may be "in use," as indicated by the regions enclosed by solid lines in FIG. 6B, or "not in use," as indicated by the regions enclosed by dashed lines in FIG. 6B. The "in use" display tiles 475 are occupied by graphical widgets previously created or selected by a user, while the "not in use" display tiles 475 remain available for movement therein of existing graphical widgets displayed in another display tile of the display pane 470 or placement therein of newly created/selected graphical widgets. In several embodiments, the display tiles 475 may be moved or resized by a user according to a grid layout, as shown in FIG. 6B. In addition, or instead, although described herein as including the display tiles 475, the display pane 470 may instead incorporate movable, resizable windows that are not limited to a particular grid layout but may instead be sized and or positioned in the display pane 470 of the graphical user interface 405 in any manner desired by the user.

Figure 6C:
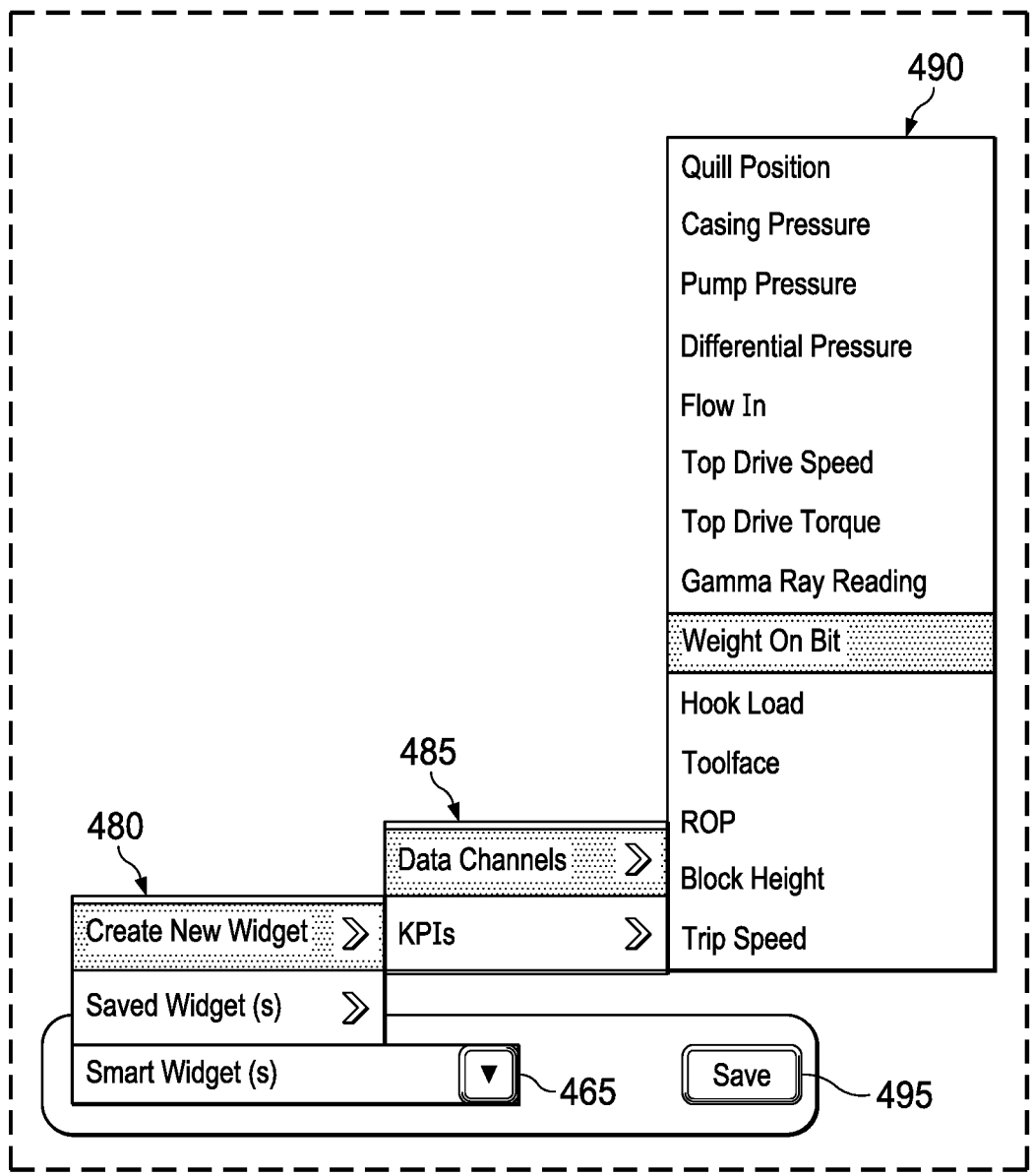
FIG. 6C is a graphical view of a widget dropdown menu viewable on the graphical user interface of FIGS. 6A-1, 6A-2, and 6B, according to one or more embodiments of the present disclosure.

In an embodiment, as illustrated in FIG. 6C, the "graphical widget" menu 465 includes dropdown menus 480, 485, and 490, among others. The dropdown menu 480 allows a user to choose between creating a new graphical widget or selecting a previously saved graphical widget for placement in the display pane 470. Once a user has created the new graphical widget or selected the previously saved graphical widget, as will be described in further detail below, the user may select one or more of the display tiles 475 "not in use" for placement of the created or selected graphical widget in the display pane 470. The dropdown menu 485 appears on the graphical user interface 405 in response to a user's choice to create a new graphical widget by selecting this option from the dropdown menu 480. In several embodiments, the dropdown menu 485 allows a user to choose between a new graphical widget based on one of the data streams/channels sent from the sensor engine 355 or a new graphical widget based on a key performance indicator ("KPI"). Alternatively, another dropdown menu (not shown) may appear on the graphical user interface 405 in response to a user's choice to select a previously saved graphical widget by selecting this option in the dropdown menu 480. Any newly created graphical widget may be saved to this other dropdown menu by a user via a "save" button 495 (also shown in FIGS. 6A-1 and 6B) of the "graphical widget" menu 465 so as to be readily accessible in the future via the dropdown menu 480 without the need for the user to recreate the graphical widget from scratch.

If the user chooses to base the new graphical widget on one of the data streams/channels sent from the sensor engine 355 by selecting this option from the dropdown menu 485, the dropdown menu 490 will appear on the graphical user interface 405. The dropdown menu 490 allows a user to choose between various data streams/channels being sent from the sensor engine 355. For example, as shown in FIG. 6C, the user may choose between quill position (e.g., detected by the quill position sensor 285), casing pressure (e.g., detected by the surface casing annular pressure sensor 195, the downhole annular pressure sensor 170a, and/or the MWD casing pressure sensor 230), pump pressure (e.g., detected by the pump pressure sensor 295), differential pressure (e.g., detected by the mud motor ΔP sensor 205a and/or the mud motor ΔP sensor 240), flow in, top drive speed (e.g., detected by the speed sensor 135b and/or the rotary RPM sensor 305), top drive torque (e.g., detected by the torque sensor 135a and/or the rotary torque sensor 280), gamma ray reading(s), weight-on-bit (e.g., detected by the WOB sensor 170d and/or the MWD WOB sensor 260), hook load (e.g., detected by the WOB sensor 135c and/or the hook load sensor 290), toolface (e.g., detected by the toolface sensor 170c, the magnetic toolface sensor 245, and/or the gravity toolface sensor 250), ROP, block height, and trip speed, among others. Although one embodiment of the dropdown menu has been described with reference to FIG. 6C, any combination of data streams/channels sent from any one of the various sensors of the sensor engine 355 described herein may be included in the dropdown menu. Alternatively, if the user chooses to base the new graphical widget on a KPI by selecting this option from the dropdown menu, another dropdown menu (not shown) will appear on the graphical user interface 405. This other dropdown menu may include KPIs such as, for example, pre-slide time, toolface setting time, burned time, burned footage, slide score, slide time, trip speed, connection time, rate of penetration ("ROP"), etc. One or more of these KPIs can be used to define success criteria for each task in a drilling process.

In several embodiments, the pre-slide time can be defined as the amount of time it takes to initiate slide drilling—one or more of the following tasks may be achieved during the pre-slide time: removing trapped torque from the drill string 165, oscillating the drill string 165 before the initiation of slide drilling, and obtaining the target toolface orientation. In several embodiments, the toolface setting time can be defined as the amount of time it takes to obtain the target toolface orientation for a particular stand. In several embodiments, the burned time can be defined as the amount of time it takes after the initiation of slide drilling for a particular stand to receive a set number of consecutive toolface orientation readings (e.g., two consecutive readings) from the sensor engine 355 within a set range (e.g., 45 degrees) of the target toolface orientation. In several embodiments, the burned footage can be defined as the length of the wellbore segment drilled during the burned time. In several embodiments, the slide ROP can be obtained, for example, by averaging the on-bottom slide ROP over a period including off-bottom time during the slide. Finally, in several embodiments, the slide score can be obtained by receiving a set number of consecutive toolface orientation readings from the sensor engine 355 and comparing those readings with the target toolface orientation during the same period. For example, if the target toolface orientation was constant at 300 degrees during the period in question, the planned path of the wellbore 160 would curve up and to the left along a single plane. However, if the consecutive toolface orientation readings received from the sensor engine 355 during the same period included readings of 5 degrees, 20 degrees, 358 degrees, 340 degrees, 272 degrees, 3 degrees, 260 degrees, and 200 degrees, the actual path of the wellbore 160 would curve generally up and to the left along several different planes. This results in a difference between the planned and actual paths of the wellbore 160, which difference can be assigned a slide score from −100% to +100% depending on how close the actual path comes to the planned path.

Figure 6D:
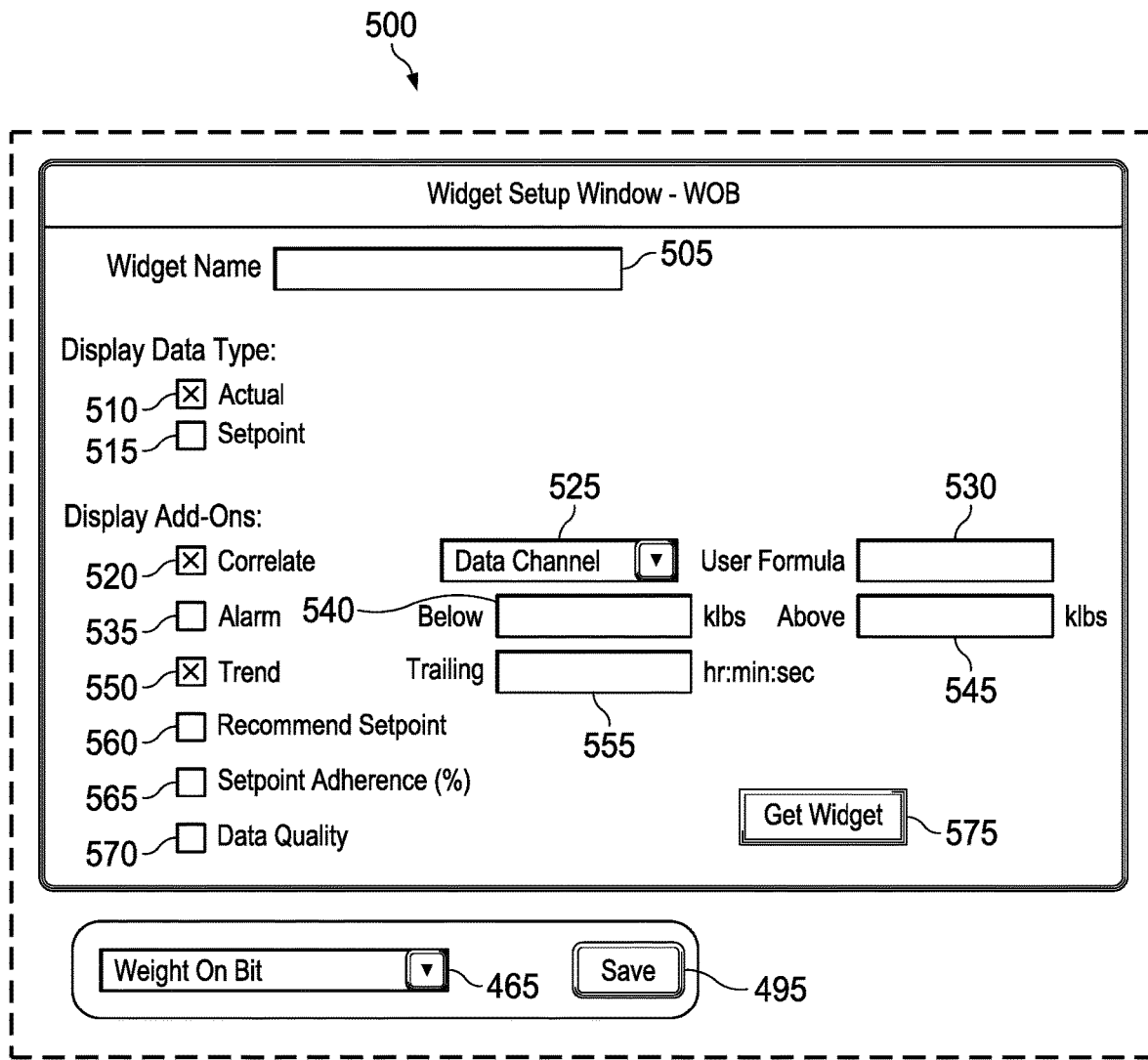
FIG. 6D is a graphical view of a widget setup window viewable on the graphical user interface of FIG. 6B, according to one or more embodiments of the present disclosure.

In an embodiment, as illustrated in FIG. 6D with continuing reference to FIG. 6C, upon a user's selection from the dropdown menu 390 of one of the data streams/channels sent from the sensor engine 355, the user is presented with a widget setup window 500. More particularly, FIG. 6C illustrates an embodiment in which the user has selected "weight-on-bit" from the dropdown menu 490, and is therefore presented on the graphical user interface 405 with the widget setup window 500 corresponding to weight-on-bit data streams/channel sent from the sensor engine 355. In several embodiments, each of the data streams/channels in the dropdown menu 390 is associated with its own widget setup window 500; certain elements/components of the different widget setup windows 500 associated with the various data streams/channels in the dropdown menu 390 may be substantially identical to each other. The widget setup window 500 may include a data field 505 in which the user may enter a name to be displayed as part of the to-be-created graphical widget. The widget setup window 500 may also include a checkbox 510 that allows the user to display as part of the to-be-created graphical widget the real time gauge reading of the data stream/channel selected from the dropdown menu 490. The widget setup window 500 may also include a checkbox 515 that allows the user to display as part of the to-be-created graphical widget the setpoint of the data stream/channel selected from the dropdown menu 490.

The widget setup window 500 may also include a checkbox 520 that allows the user to display as part of the to-be-created graphical widget a correlation between the real time gauge reading of the data stream/channel selected from the dropdown menu 490 and another user-selected data stream/channel. Accordingly, the widget setup window 500 may also include a dropdown menu 525 that allows the user, in response to the user's "checking" of the checkbox 520, to select the another data stream/channel to correlate with the real time gauge reading of the data stream/channel selected from the dropdown menu 490. In several embodiments, the dropdown menu 525 is substantially similar to the dropdown menu 490, except that the data stream/channel selected from the dropdown menu 490 is omitted from the dropdown menu 525. The widget setup window 500 may also include a data field 530 that allows a user, in response to the user's selection of the another data stream/channel from the dropdown menu 525 to correlate with the real time gauge reading of the data stream/channel selected from the dropdown menu 490, to enter a mathematical function to be applied to the data stream/channel selected from the dropdown menu 490 and the another data stream/channel selected from the dropdown menu 525 in order to achieve a desired correlation. In addition to, or instead of, the data field 530, the widget setup window 500 may include a dropdown menu (not shown) of predefined mathematical function(s) to correlate the data stream/channel selected from the dropdown menu 490 with the another data stream/channel selected from the dropdown menu 525.

The widget setup window 500 may also include a checkbox 535 that allows the user to set as part of the to-be-created graphical widget an alarm that will go off when the real time gauge reading of the data stream/channel selected from the dropdown menu 490 drops below a lower threshold and/or rises above an upper threshold. Accordingly, the widget setup window 500 may also include a data field 540 that allows the user, in response to the user's "checking" of the checkbox 535, to enter a lower threshold value below which the alarm will sound. Similarly, the widget setup window 500 may also include a data field 545 that allows the user, in response to the user's "checking" of the checkbox 535, to enter an upper threshold value above which the alarm will sound. In several embodiments, when the checkbox 535 is "checked" by the user, the user must enter at least one of the lower threshold value or the upper threshold value into the data field 540 or the data field 545, respectively, in order for the alarm to properly function as part of the to-be-created graphical widget.

The widget setup window 500 may also include a checkbox 550 that allows the user to display as part of the to-be-created graphical widget a historical trendline of the data stream/channel selected from the dropdown menu 490. Accordingly, the widget setup window 500 may also include a data field 555 that allows the user, in response to the user's "checking" of the checkbox 550, to enter the trailing time interval over which the trendline is to be displayed in the to-be-created graphical widget. The widget setup window 500 may also include a checkbox 560 that allows the user to display as part of the to-be-created graphical widget a recommended setpoint. The widget setup window 500 may also include a checkbox 565 that allows the user to display as part of the to-be-created graphical widget a setpoint adherence percentage. The widget setup window 500 may also include a checkbox 570 that allows the user to display as part of the to-be-created graphical widget a data quality indicator. In several embodiments, the data quality indicator is based at least in part on clarity of the data stream and/or the amount of static in the signal received over the data channel selected from the dropdown menu 490. Finally, the widget setup window 500 includes a "get widget" button 575 that is selectable by the user once the user has configured the checkboxes 510, 515, 520, 535, 550, 560, 565, and/or 570, the data fields 505, 530, 540, 545, and/or 555, and/or the dropdown menu 525 of the widget setup window 500 in a desired manner.

Referring back to FIG. 5, with continuing reference to FIGS. 6A-1, 6A-2, and 6B-6D, in an embodiment, the user's inputs into the interface engine 350 via the graphical user interface 405 are collectively referred to by the reference numeral 580. The user's inputs 580 may include, but are not limited to, the user's selection of options from the dropdown menus 480, 485, and/or 490 of the "graphical widget" menu 465, the user's configuration of the checkboxes 510, 515, 520, 535, 550, 560, 565, and/or 570, the data fields 505, 530, 540, 545, and/or 555, and/or the dropdown menu 525 of the widget setup window 500, and/or the user's selection of the "get widget" button 575 of the widget setup window 500, among other user inputs. Once the user's inputs 580 are entered into the interface engine 350 (as indicated by arrow 585), the user's selection of the "get widget" button 575 causes all of the user's inputs 580 to be sent to the graphical widget generator engine 365 (as indicated by arrow 590) together with a command for the graphical widget generator engine 365 to create the new graphical widget according to the user's inputs 580. Finally, the graphical widget generator engine 365 generates the new graphical widget according to the user's inputs 580 and sends the new graphical widget to the interface engine 350 for display in the display pane 470 of the graphical user interface 405, as indicated by arrow 595. The user may then size and/or position the newly created graphical widget in the display pane 470 as desired.

Figure 7:
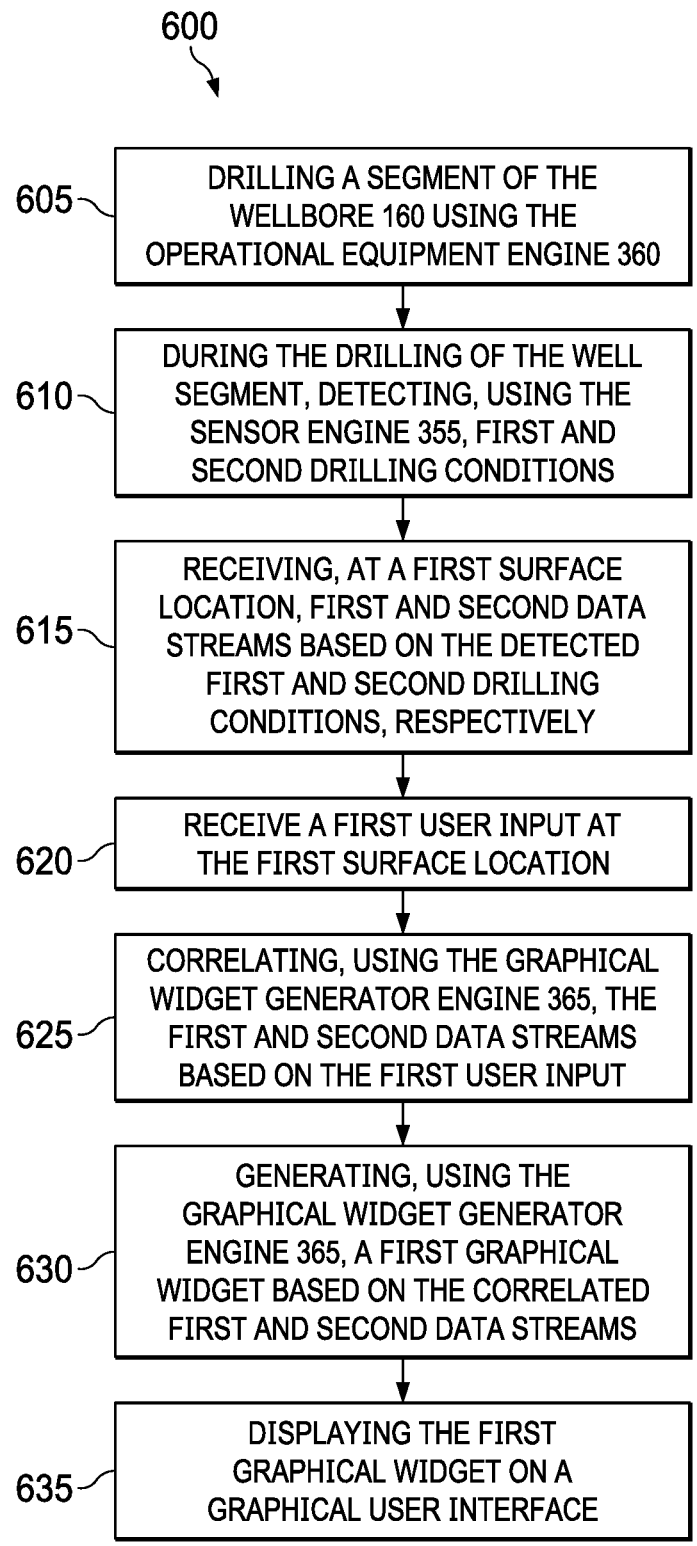
FIG. 7 is a flow diagram of a method for implementing one or more embodiments of the present disclosure.

In an embodiment, as illustrated in FIG. 7, a method of operating the system 340 to generate graphical widget(s) is generally referred to by the reference numeral 600. The method 600 is carried out in response to control signals being send from the control system 345 to the operational equipment engine 360. The method 600 includes at step 605 drilling a segment of the wellbore 160 using the operational equipment engine 360. At a step 610, during the drilling of the well segment, first and second drilling conditions are detected using first and second sensors, respectively, of the sensor engine 355. At a step 615, first and second data streams based on the detected first and second drilling conditions, respectively, are received at a first surface location (e.g., at the control system 345). At a step 620, a first user input is received at the first surface location (e.g., at the control system 345). At a step 625, the first and second data streams received at the first surface location are correlated based on the first user input using the graphical widget generator engine 365. At a step 630, a first graphical widget a generated based on the correlated first and second data streams using the graphical widget generator engine 365. Finally, at a step 635, the first graphical widget is displayed using the interface engine 350 on a graphical user interface (GUI) (e.g., the display unit 225 or another display unit).

Although not shown in FIG. 7, in several embodiments, the method 600 further comprises receiving a second user input at a second surface location. In at least one such embodiment, at least one of the first or second surface locations may be at or near the drilling rig, and the first and second surface locations are remote from one another. The step 630 of generating the first graphical widget may further be based on the second user input. For example, the first user input may include a user's selection of the second data stream with which to correlate the first data stream (e.g., via the dropdown menu 525), and the second user input may include a mathematical function for correlating the first and second data streams (e.g., via the data field 530 or the dropdown menu (not shown) of predefined mathematical function(s)). In at least another such embodiment, the method 600 further includes generating a second graphical widget based on the second user input, and displaying the second graphical widget on the GUI alongside the first graphical widget. Finally, the method 600 may include, during the drilling of the well segment, detecting, using a third sensor, a third drilling condition, and receiving, at the second surface location, a third data stream based on the detected third drilling condition, wherein generating the second graphical widget is further based on the third data stream.

In several embodiments, the operation of the system 340 and/or the execution of the method 600 contextualizes multiple data streams in a manner that allows for proper evaluation of performance and possible tool failures under varying downhole conditions. Although described herein with respect to "first and second data streams," the system 340 and or the method 600 may be utilized to correlate more than two data streams (e.g., three, four, five, six, seven, eight, nine, ten, or more data streams may be correlated using the system 340 and/or the method 600). For example, the system 340 and/or the method 600 may be utilized to correlate multiple correlated data streams against another non-correlated data stream. Thus, the system 340 and/or the method 600 may be utilized iteratively to achieve correlation of more than two data streams.

Figure 8:
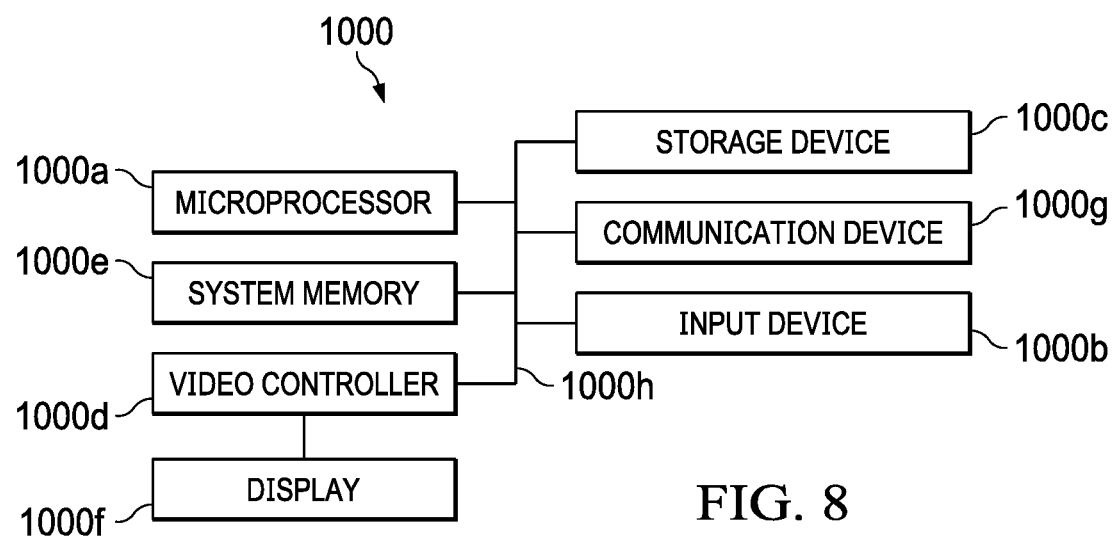
FIG. 8 is a diagrammatic illustration of a computing node for implementing one or more embodiments of the present disclosure.

In an embodiment, as illustrated in FIG. 8, a computing node 1000 for implementing one or more embodiments of one or more of the above-described elements, systems (e.g., 100, 210, and/or 340), methods (e.g., 600) and/or steps (e.g., 605, 610, 615, 620, 625, 630, and/or 635), and/or any combination thereof, is depicted. The node 1000 includes a microprocessor 1000*a*, an input device 1000*b*, a storage device 1000*c*, a video controller 1000*d*, a system memory 1000*e*, a display 1000*f*, and a communication device 1000*g* all interconnected by one or more buses 1000*h*. In several embodiments, the storage device 1000*c* may include a floppy drive, hard drive, CD-ROM, optical drive, any other form of storage device and/or any combination thereof. In several embodiments, the storage device 1000*c* may include, and/or be capable of receiving, a floppy disk, CD-ROM, DVD-ROM, or any other form of computer-readable medium that may contain executable instructions. In several embodiments, the communication device 1000*g* may include a modem, network card, or any other device to enable the node 1000 to communicate with other nodes. In several embodiments, any node represents a plurality of interconnected (whether by intranet or Internet) computer systems, including without limitation, personal computers, mainframes, PDAs, smartphones and cell phones.

In several embodiments, one or more of the components of any of the above-described systems include at least the node 1000 and/or components thereof, and/or one or more nodes that are substantially similar to the node 1000 and/or components thereof. In several embodiments, one or more of the above-described components of the node 1000 and/or the above-described systems include respective pluralities of same components.

In several embodiments, a computer system typically includes at least hardware capable of executing machine readable instructions, as well as the software for executing acts (typically machine-readable instructions) that produce a desired result. In several embodiments, a computer system may include hybrids of hardware and software, as well as computer sub-systems.

In several embodiments, hardware generally includes at least processor-capable platforms, such as client-machines (also known as personal computers or servers), and handheld processing devices (such as smart phones, tablet computers, personal digital assistants (PDAs), or personal computing devices (PCDs), for example). In several embodiments, hardware may include any physical device that is capable of storing machine-readable instructions, such as memory or other data storage devices. In several embodiments, other forms of hardware include hardware sub-systems, including transfer devices such as modems, modem cards, ports, and port cards, for example.

In several embodiments, software includes any machine code stored in any memory medium, such as RAM or ROM, and machine code stored on other devices (such as floppy disks, flash memory, or a CD ROM, for example). In several embodiments, software may include source or object code. In several embodiments, software encompasses any set of instructions capable of being executed on a node such as, for example, on a client machine or server.

In several embodiments, combinations of software and hardware could also be used for providing enhanced functionality and performance for certain embodiments of the present disclosure. In an embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several embodiments, computer readable mediums include, for example, passive data storage, such as a random access memory (RAM) as well as semi-permanent data storage such as a compact disk read only memory (CD-ROM). One or more embodiments of the present disclosure may be embodied in the RAM of a computer to transform a standard computer into a new specific computing machine. In several embodiments, data structures are defined organizations of data that may enable an embodiment of the present disclosure. In an embodiment, a data structure may provide an organization of data, or an organization of executable code.

In several embodiments, any networks and/or one or more portions thereof, may be designed to work on any specific architecture. In an embodiment, one or more portions of any networks may be executed on a single computer, local area networks, client-server networks, wide area networks, internets, hand-held and other portable and wireless devices and networks.

In several embodiments, a database may be any standard or proprietary database software, such as Oracle, Microsoft Access, SyBase, or DBase II, for example. In several embodiments, the database may have fields, records, data, and other database elements that may be associated through database specific software. In several embodiments, data may be mapped. In several embodiments, mapping is the process of associating one data entry with another data entry. In an embodiment, the data contained in the location of a character file can be mapped to a field in a second table. In several embodiments, the physical location of the database is not limiting, and the database may be distributed. In an embodiment, the database may exist remotely from the server, and run on a separate platform. In an embodiment, the database may be accessible across the Internet. In several embodiments, more than one database may be implemented.

In several embodiments, a plurality of instructions stored on a computer readable medium may be executed by one or more processors to cause the one or more processors to carry out or implement in whole or in part the above-described operation of each of the above-described elements, systems (e.g., 100, 210, and/or 340), methods (e.g., 600) and/or steps (e.g., 605, 610, 615, 620, 625, 630, and/or 635), and/or any combination thereof. In several embodiments, such a processor may include one or more of the microprocessor 1000a, any processor(s) that are part of the components of the above-described systems, and/or any combination thereof, and such a computer readable medium may be distributed among one or more components of the above-described systems. In several embodiments, such a processor may execute the plurality of instructions in connection with a virtual computer system. In several embodiments, such a plurality of instructions may communicate directly with the one or more processors, and/or may interact with one or more operating systems, middleware, firmware, other applications, and/or any combination thereof, to cause the one or more processors to execute the instructions.

A method has been disclosed. The method generally includes drilling a well segment using a drilling rig; during the drilling of the well segment, detecting, using first and second sensors, first and second drilling conditions, respectively; receiving, at a first surface location, first and second data streams based on the detected first and second drilling conditions, respectively; receiving a first user input at the first surface location; correlating the first and second data streams based on the first user input; generating a first graphical widget based on the correlated first and second data streams; and displaying the first graphical widget on a graphical user interface (GUI).

The foregoing method embodiment may include one or more of the following elements, either alone or in combination with one another:
  Receiving a second user input at a second surface location.
  At least one of the first or second surface locations is at or near the drilling rig; and the first and second surface locations are remote from one another.
  Generating the first graphical widget is further based on the second user input.
  The first user input includes a user's selection of the second data stream with which to correlate the first data stream; and the second user input includes a mathematical function for correlating the first and second data streams.
  Generating a second graphical widget based on the second user input; and displaying the second graphical widget on the GUI alongside the first graphical widget.
  During the drilling of the well segment, detecting, using a third sensor, a third drilling condition; and receiving, at the second surface location, a third data stream based on the detected third drilling condition; wherein generating the second graphical widget is further based on the third data stream.

A system has also been disclosed. The system generally includes an operational equipment engine adapted to drill a well segment; a sensor engine associated with the operational equipment engine and adapted to detect first and second drilling conditions during the drilling of the well segment; a graphical widget generator engine adapted to: correlate first and second data streams received at a first surface location based on a first user input received at the first surface location, the first and second data streams being based on the detected first and second drilling conditions, respectively; and generate a first graphical widget based on the correlated first and second data streams; and an interface engine adapted to display the first graphical widget on a graphical user interface (GUI).

The foregoing system embodiment may include one or more of the following elements, either alone or in combination with one another:
  The graphical widget generator engine is adapted to generate the first graphical widget based further on a second user input received at a second surface location.
  At least one of the first or second surface locations is at or near the drilling rig; and the first and second surface locations are remote from one another.
  The first user input includes a user's selection of the second data stream with which to correlate the first data stream; and the second user input includes a mathematical function for correlating the first and second data streams.
  The graphical widget generator engine is adapted to: generate a second graphical widget based on a second user input received at a second surface location; and display the second graphical widget on the GUI alongside the first graphical widget.
  At least one of the first or second surface locations is at or near the drilling rig; and the first and second surface locations are remote from one another.
  The sensor engine is adapted to detect a third drilling condition during the drilling of the well segment; and the graphical widget generator engine is adapted to generate the second graphical widget based further on a third data stream received at the second surface location, the third data stream being based on the detected third drilling condition.

An apparatus has also been disclosed. The apparatus generally includes a non-transitory computer readable medium; and a plurality of instructions stored on the non-transitory computer readable medium and executable by one or more processors, the plurality of instructions including: instructions that, when executed, cause the one or more processors to drill a well segment using an operational equipment engine; instructions that, when executed, cause the one or more processors to detect, using a sensor engine associated with the operational equipment engine, first and second drilling conditions during the drilling of the well segment; instructions that, when executed, cause the one or more processors to correlate, using a graphical widget generator engine and based on a first user input received at a first surface location, first and second data streams received at the first surface location, the first and second data streams being based on the detected first and second drilling conditions, respectively; instructions that, when executed, cause the one or more processors to generate, using the graphical widget generator engine and based on the correlated first and second data streams, a first graphical widget; and instructions that, when executed, cause the one or more processors to display, using an interface engine, the first graphical widget on a graphical user interface (GUI).

The foregoing apparatus embodiment may include one or more of the following elements, either alone or in combination with one another:
  The plurality of instructions further include instructions that, when executed, cause the one or more processors to generate the first graphical widget based further on a second user input received at a second surface location.
  At least one of the first or second surface locations is at or near the drilling rig; and the first and second surface locations are remote from one another.
  The first user input includes a user's selection of the second data stream with which to correlate the first data stream; and the second user input includes a mathematical function for correlating the first and second data streams.

The plurality of instructions further include: instructions that, when executed, cause the one or more processors to generate, using the graphical widget generator engine and based on a second user input received at a second surface location, a second graphical widget, the second surface location being at, near, or remote from the first surface location; and instructions that, when executed, cause the one or more processors to display, using the interface engine, the second graphical widget on the GUI alongside the first graphical widget.

The plurality of instructions further include: instructions that, when executed, cause the one or more processors to detect, using the sensor engine, a third drilling condition during the drilling of the well segment; and instructions that, when executed, cause the one or more processors to generate, using the graphical widget generator engine and based further on a third data stream received at the second surface location, the second graphical widget, the third data stream being based on the detected third drilling condition.

It is understood that variations may be made in the foregoing without departing from the scope of the present disclosure.

In several embodiments, the elements and teachings of the various embodiments may be combined in whole or in part in some or all of the embodiments. In addition, one or more of the elements and teachings of the various embodiments may be omitted, at least in part, and/or combined, at least in part, with one or more of the other elements and teachings of the various embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several embodiments, while different steps, processes, and procedures are described as appearing as distinct acts, one or more of the steps, one or more of the processes, and/or one or more of the procedures may also be performed in different orders, simultaneously and/or sequentially. In several embodiments, the steps, processes, and/or procedures may be merged into one or more steps, processes and/or procedures.

In several embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several embodiments have been described in detail above, the embodiments described are illustrative only and are not limiting, and those skilled in the art will readily appreciate that many other modifications, changes and/or substitutions are possible in the embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112, paragraph 6 for any limitations of any of the claims herein, except for those in which the claim expressly uses the word "means" together with an associated function.

What is claimed is:

1. A method, comprising:
   drilling a well segment using a drilling rig;
   during the drilling of the well segment, detecting, using first and second sensors, first and second drilling conditions, respectively;
   receiving, at a first surface location, first and second data streams based on the detected first and second drilling conditions, respectively;
   receiving a first user input at the first surface location;
   correlating the first and second data streams based on the first user input;
   generating a first graphical widget based on the correlated first and second data streams; and
   displaying the first graphical widget on a graphical user interface (GUI).

2. The method of claim 1, further comprising receiving a second user input at a second surface location.

3. The method of claim 2, wherein at least one of the first or second surface locations is at or near the drilling rig; and wherein the first and second surface locations are remote from one another.

4. The method of claim 2, wherein generating the first graphical widget is further based on the second user input.

5. The method of claim 4, wherein the first user input comprises a user's selection of the second data stream with which to correlate the first data stream; and
   wherein the second user input comprises a mathematical function for correlating the first and second data streams.

6. The method of claim 2, further comprising:
   generating a second graphical widget based on the second user input; and
   displaying the second graphical widget on the GUI alongside the first graphical widget.

7. The method of claim 6, further comprising:
   during the drilling of the well segment, detecting, using a third sensor, a third drilling condition; and
   receiving, at the second surface location, a third data stream based on the detected third drilling condition;
   wherein generating the second graphical widget is further based on the third data stream.

8. A system, comprising:
   one or more control systems;
   an operational equipment engine adapted to drill a well segment;
   a sensor engine associated with the operational equipment engine and adapted to detect first and second drilling conditions during the drilling of the well segment;
   a graphical widget generator engine adapted to:
   correlate first and second data streams received at a first surface location based on a first user input received at the first surface location, the first and second data streams being based on the detected first and second drilling conditions, respectively; and
   generate a first graphical widget based on the correlated first and second data streams; and
   an interface engine adapted to display the first graphical widget on a graphical user interface (GUI);

wherein the one or more control systems are configured to control the operational equipment engine, the sensor engine, the graphical widget generator, the interface engine, or any combination thereof.

9. The system of claim 8, wherein the graphical widget generator engine is adapted to generate the first graphical widget based further on a second user input received at a second surface location.

10. The system of claim 9, wherein at least one of the first or second surface locations is at or near the drilling rig; and
wherein the first and second surface locations are remote from one another.

11. The system of claim 9, wherein the first user input comprises a user's selection of the second data stream with which to correlate the first data stream; and
wherein the second user input comprises a mathematical function for correlating the first and second data streams.

12. The system of claim 8, wherein the graphical widget generator engine is adapted to:
generate a second graphical widget based on a second user input received at a second surface location; and
display the second graphical widget on the GUI alongside the first graphical widget.

13. The system of claim 12, wherein at least one of the first or second surface locations is at or near the drilling rig; and
wherein the first and second surface locations are remote from one another.

14. The system of claim 12, wherein the sensor engine is adapted to detect a third drilling condition during the drilling of the well segment; and
wherein the graphical widget generator engine is adapted to generate the second graphical widget based further on a third data stream received at the second surface location, the third data stream being based on the detected third drilling condition.

15. An apparatus, comprising:
a non-transitory computer readable medium; and
a plurality of instructions stored on the non-transitory computer readable medium and executable by one or more processors, the plurality of instructions comprising:
instructions that, when executed, cause the one or more processors to drill a well segment using an operational equipment engine;
instructions that, when executed, cause the one or more processors to detect, using a sensor engine associated with the operational equipment engine, first and second drilling conditions during the drilling of the well segment;
instructions that, when executed, cause the one or more processors to correlate, using a graphical widget generator engine and based on a first user input received at a first surface location, first and second data streams received at the first surface location, the first and second data streams being based on the detected first and second drilling conditions, respectively;
instructions that, when executed, cause the one or more processors to generate, using the graphical widget generator engine and based on the correlated first and second data streams, a first graphical widget; and
instructions that, when executed, cause the one or more processors to display, using an interface engine, the first graphical widget on a graphical user interface (GUI).

16. The apparatus of claim 15, wherein the plurality of instructions further comprise:
instructions that, when executed, cause the one or more processors to generate the first graphical widget based further on a second user input received at a second surface location.

17. The apparatus of claim 16, wherein at least one of the first or second surface locations is at or near the drilling rig; and
wherein the first and second surface locations are remote from one another.

18. The apparatus of claim 16, wherein the first user input comprises a user's selection of the second data stream with which to correlate the first data stream; and
wherein the second user input comprises a mathematical function for correlating the first and second data streams.

19. The apparatus of claim 15, wherein the plurality of instructions further comprise:
instructions that, when executed, cause the one or more processors to generate, using the graphical widget generator engine and based on a second user input received at a second surface location, a second graphical widget, the second surface location being at, near, or remote from the first surface location; and
instructions that, when executed, cause the one or more processors to display, using the interface engine, the second graphical widget on the GUI alongside the first graphical widget.

20. The apparatus of claim 19, wherein the plurality of instructions further comprise:
instructions that, when executed, cause the one or more processors to detect, using the sensor engine, a third drilling condition during the drilling of the well segment; and
instructions that, when executed, cause the one or more processors to generate, using the graphical widget generator engine and based further on a third data stream received at the second surface location, the second graphical widget, the third data stream being based on the detected third drilling condition.

* * * * *